United States Patent
Furuta

(10) Patent No.: US 11,945,274 B2
(45) Date of Patent: Apr. 2, 2024

(54) VEHICLE ROLL CONTROL APPARATUS

(71) Applicant: TOYOTA JIDOSHA KABUSHIKI KAISHA, Toyota (JP)

(72) Inventor: Hiroki Furuta, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/950,540

(22) Filed: Sep. 22, 2022

(65) Prior Publication Data

US 2023/0102687 A1 Mar. 30, 2023

(30) Foreign Application Priority Data

Sep. 30, 2021 (JP) ................. 2021-161454

(51) Int. Cl.
*B60G 17/016* (2006.01)
*B60G 21/055* (2006.01)

(52) U.S. Cl.
CPC ..... *B60G 17/0162* (2013.01); *B60G 21/0555* (2013.01); *B60G 2400/104* (2013.01); *B60G 2800/012* (2013.01)

(58) Field of Classification Search
CPC ............ B60G 17/0162; B60G 21/0555; B60G 2400/104; B60G 2800/012
USPC ......................................................... 701/38
See application file for complete search history.

(56) References Cited

U.S. PATENT DOCUMENTS

| 2010/0318262 A1 | 12/2010 | Mizuta |
| 2021/0331545 A1 | 10/2021 | Furuta |

FOREIGN PATENT DOCUMENTS

| JP | 2874427 B2 | 3/1999 | |
| JP | H0732846 A | * 2/2005 | |
| JP | 2005238972 A | * 9/2005 | ......... B60G 17/0162 |
| JP | 2007137165 A | * 6/2007 | |
| JP | 2008-137446 A | 6/2008 | |
| JP | 2011-079442 A | 4/2011 | |
| JP | 2021-172286 A | 11/2021 | |

* cited by examiner

*Primary Examiner* — Lindsay M Low
*Assistant Examiner* — Omar Morales
(74) *Attorney, Agent, or Firm* — Dinsmore & Shohl LLP

(57) ABSTRACT

A vehicle roll control apparatus comprises a pair of left and right active suspensions for applying vertical forces in opposite phases to left and right wheels of a rear axle of the vehicle, and a controller for controlling the active suspensions. The controller increases control amounts of the active suspensions so as to increase roll stiffness of the rear axle in accordance with an increase in a lateral acceleration acting on the vehicle. When the lateral acceleration increases beyond the low acceleration range to the high acceleration range, the controller decreases the gain of the control amounts of the active suspensions with respect to the lateral acceleration in accordance with the increase in the lateral acceleration.

7 Claims, 13 Drawing Sheets

VEHICLE ROLL CONTROL APPARATUS

CROSS-REFERENCE TO RELATED APPLICATION

The present application claims priority under 35 U.S.C. § 119 to Japanese Patent Application No. 2021-161454, filed Sep. 30, 2021, the contents of which application are incorporated herein by reference in their entirety.

BACKGROUND

Field

The present disclosure relates to a vehicle roll control apparatus.

Background Art

JP2008-137446A discloses a conventional roll control apparatus for a vehicle. The roll control device disclosed in JP2008-137446A is configured to estimate a lateral acceleration acting on the vehicle at a front wheel position and a rear wheel position, and to control each active stabilizer provided at a front axle and a rear axle with a control amount based on the estimated lateral acceleration.

SUMMARY

The active stabilizer can variably control roll stiffness. In the above-described prior art, since the active stabilizer is provided in each of the front axle and the rear axle, it is possible to maintain the balance of the roll stiffness between the front axle and the rear axle.

However, in the case of a vehicle in which a roll stiffness varying actuator such as an active stabilizer is provided on only one of the front axle and the rear axle, the roll stiffness distribution ratio may be biased toward the side on which the roll stiffness varying actuator is provided when the vehicle turns.

In addition, even in a case where the roll stiffness varying actuators are provided on both the front axle and the rear axle, when there is a difference in output between them, the roll stiffness distribution ratio may be biased to the side provided with the roll stiffness varying actuator having a larger output. A deviation in the roll stiffness distribution ratio can lead to oversteering or extreme understeering when the vehicle turns in the vicinity of a critical region.

The present disclosure has been made in view of the above-described problems. An object of the present disclosure is to provide a technique for suppressing the behavior of a vehicle whose roll stiffness distribution changes according to a roll state from becoming unstable in the vicinity of a critical region.

The present disclosure provides a vehicle roll control apparatus. The vehicle roll control apparatus according to the present disclosure comprises: a first roll stiffness varying device provided for a first axle of the vehicle and configured to vary roll stiffness of the first axle; and a controller configured to control the first roll stiffness varying device. The first roll stiffness varying device may be a pair of left and right actuators provided for the left and right wheels of the first axle and configured to apply vertical forces in opposite phases to the left and right wheels of the first axle. Further, the first roll stiffness varying device may be an active stabilizer connecting a pair of left and right suspensions provided for left and right wheels of the first axle. Further, the first roll stiffness varying device may be an actuator provided for one wheel of the first axle and configured to apply a vertical force to the one wheel. The controller includes, for example, at least one processor and at least one memory storing a program executable by the processor.

In the vehicle roll control apparatus according to the present disclosure, the controller is configured to execute the following first processing and second processing. The first processing is to increase a control amount of the first roll stiffness varying device so as to increase the roll stiffness of the first axle in accordance with an increase in a lateral acceleration acting on the vehicle. The second processing is to decrease a gain of the control amount of the first roll stiffness varying device with respect to the lateral acceleration in accordance with the increase in the lateral acceleration when the lateral acceleration increases to a high acceleration range beyond a low acceleration range. The fact that the lateral acceleration has increased to the high acceleration range beyond the low acceleration range may be estimated based on the lateral acceleration reaching a predetermined value, or may be estimated based on any suspension hitting a bound stopper or shrinking to a vicinity of the bound stopper. Further, the fact that the lateral acceleration has increased to the high acceleration range beyond the low acceleration range may be estimated based on roll stiffness distribution ratio of the first axle reaching a predetermined value, or may be estimated based on a load transfer amount from a second axle to the first axle reaching a predetermined value.

According to the above configuration, the roll stiffness of the first axle is increased by the first roll stiffness varying device in accordance with the increase in the lateral acceleration acting on the vehicle. As a result, it is possible to suppress roll generated in the vehicle during turning. However, when the roll stiffness of the first axle is increased, the roll stiffness distribution becomes unbalanced, and the behavior of the vehicle becomes unstable in the vicinity of the critical region. In this regard, according to the above-described configuration, when the lateral acceleration increases to the high acceleration range beyond the low acceleration range, the gain of the control amount of the first roll stiffness varying device with respect to the lateral acceleration is decreased in accordance with the increase in the lateral acceleration. As a result, the imbalance in the roll stiffness distribution due to the increase in the roll stiffness of the first axle is suppressed from progressing, and the behavior of the vehicle is suppressed from becoming unstable in the vicinity of the critical region.

In one embodiment of the present disclosure, the vehicle roll control apparatus according to the present disclosure may further comprise a second roll stiffness varying device provided for a second axle of the vehicle and configured to vary roll stiffness of the second axle. However, the second roll stiffness varying device has a lower control amount output than the first roll stiffness varying device. As one example, the first roll stiffness varying device may be a pair of left and right actuators provided for left and right wheels of the first axle and configured to apply vertical forces in opposite phases to the left and right wheels of the first axle. In this example, the second roll stiffness varying device may be an active stabilizer connecting a pair of left and right suspensions provided for left and right wheels of the second axle. Alternatively, the second roll stiffness varying device may be an actuator provided for one wheel of the second axle and configured to apply a vertical force to the one wheel.

In the above embodiment, the first processing by the controller may include increasing a control amount of the second roll stiffness varying device so as to increase the roll stiffness of the second axle in accordance with the increase in the lateral acceleration acting on the vehicle. The second processing by the controller may include decreasing the gain in accordance with the increase in the lateral acceleration so that roll stiffness distribution ratio of the first axle does not exceed a predetermined value when the lateral acceleration increases to the high acceleration range beyond the low acceleration range.

According to the configuration of the above-described embodiment, the roll stiffness of the first axle is increased by the first roll stiffness varying device and the roll stiffness of the second axle is increased by the second roll stiffness varying device in accordance with the increase in the lateral acceleration acting on the vehicle. As a result, it is possible to further suppress the roll generated in the vehicle during turning. However, since the control amount output of the second roll stiffness varying device is lower than that of the first roll stiffness varying device, the roll stiffness distribution becomes unbalanced due to the difference between the roll stiffness of the first axle and the roll stiffness of the second axle, and the behavior of the vehicle becomes unstable in the vicinity of the critical region. In this regard, according to the configuration of the above-described embodiment, when the lateral acceleration increases to the high acceleration range beyond the low acceleration range, the gain of the control amount of the first roll stiffness variable device with respect to the lateral acceleration is decreased in accordance with the increase in the lateral acceleration so that the roll stiffness distribution ratio of the first axle does not exceed the predetermined value. As a result, the imbalance in the roll stiffness distribution due to a difference between the roll stiffness of the first axle and the roll stiffness of the second axle is suppressed from progressing, and the behavior of the vehicle is suppressed from becoming unstable in the vicinity of the critical region.

As described above, according to the vehicle roll control apparatus of the present disclosure, it is possible to suppress the behavior of a vehicle whose roll stiffness distribution changes according to the roll state from becoming unstable in the vicinity of the critical region.

DETAILED DESCRIPTION

Hereinafter, embodiments of the present disclosure will be described with reference to the drawings. However, in the embodiments described below, when a numerical value such as the number, quantity, amount, range, or the like of each element is mentioned, the idea according to the present disclosure is not limited to the mentioned numerical value except for a case where the numerical value is clearly specified in particular or a case where the numerical value is obviously specified to the numerical value in principle. In addition, a structure or the like described in the following embodiments is not necessary to the idea according to the present disclosure except for a case where the structure or the like is clearly specified in particular or a case where the structure or the like is obviously specified in principle.

1. First Embodiment 1-1. Vehicle Roll Control

Figure 1:
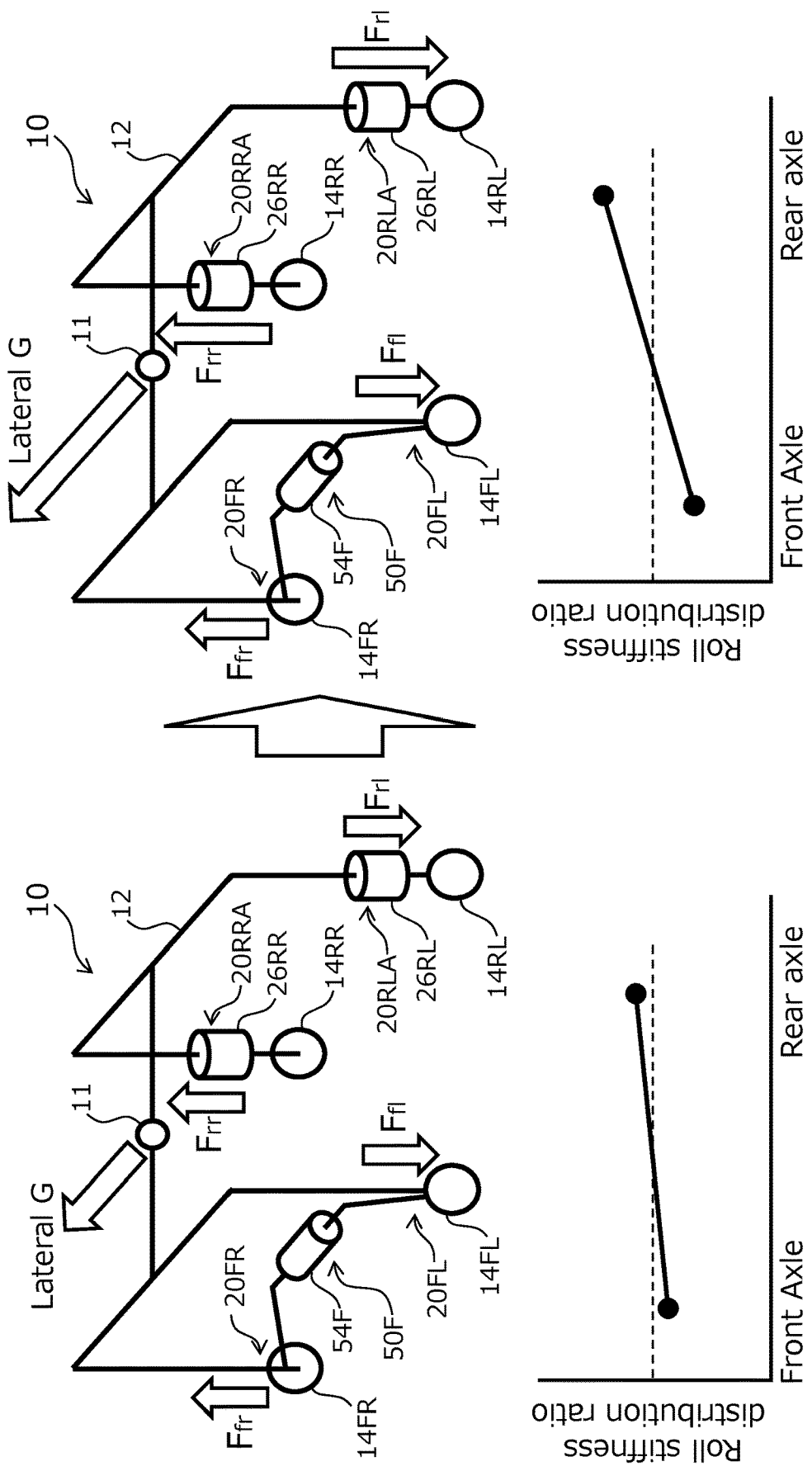
FIG. 1 is a conceptual diagram of vehicle roll control according to a first embodiment of the present disclosure.

The vehicle roll control according to the first embodiment will be described with reference to FIG. 1. FIG. 1 is a conceptual diagram of the vehicle roll control according to the first embodiment. The conceptual diagram shown in FIG. 1 shows a modeled vehicle 10, a lateral acceleration (denoted as lateral G in the drawing) acting on the gravity center 11 of the vehicle 10, and control forces for roll suppression applied by a roll stiffness varying device. A state in which the lateral acceleration is low is shown on the left side of FIG. 1, and a state in which the lateral acceleration is increased is shown on the right side of FIG. 1. FIG. 1 also contains a graph showing a change in roll stiffness distribution ratio between the front axle and the rear axle before and after the lateral acceleration increases.

The vehicle 10 shown in FIG. 1 is equipped with a pair of left and right active suspensions 20RLA and 20RRA suspending left and right wheels 14RL and 14RR of a rear axle (first axle). Specifically, the active suspensions 20RLA and 20RRA of the first embodiment are so-called full active suspensions that can actively apply a vertical control force between the vehicle body 12 and the wheels 14RL and 14RR by actuators 26RL and 26RR. Suspensions 20FL and 20FR suspending left and right wheels 14FL and 14FR of a front axle (second axle), respectively, are general suspensions without actuators, that is, non-active suspensions.

In the first embodiment, the pair of left and right active suspensions 20RLA and 20RRA function as a first roll stiffness varying device that varies the roll stiffness of the rear axle. When a rightward lateral acceleration acts on the vehicle 10 as shown in FIG. 1, a downward control force Frl is applied to the left rear wheel 14RL by the actuator 26RL, and an upward control force Frr is applied to the right rear wheel 14RR by the actuator 26RR. By applying vertical forces in opposite phases to the left and right wheels 14RL and 14RR of the rear axle in this way, the roll stiffness of the rear axle can be increased with respect to the lateral acceleration acting on the vehicle 10.

The control forces Frl and Frr applied by the actuators 26RL and 26RR of the active suspensions 20RLA and 20RRA to the left and right wheels 14RL and 14RR of the rear axle are increased in accordance with the lateral acceleration acting on the gravity center 11 of the vehicle 10. Typically, the control forces Frl and Frr are increased in proportion to the lateral acceleration. In FIG. 1, the length of an arrow line indicating the direction of the lateral acceleration indicates the magnitude of the lateral acceleration, and the lengths of arrow lines indicating the directions of the control forces Frl and Frr indicate the magnitudes of the control forces Frl and Frr.

In addition, the vehicle 10 shown in FIG. 1 is equipped with an active stabilizer 50F that connects the left and right suspensions 20FL and 20FR of the front axle. The active stabilizer 50F has an electric actuator 54F that can actively apply torsion between left and right stabilizer bars. The vehicle 10 does not have an active stabilizer on the rear axle. However, a general stabilizer without an electric actuator may be provided on the rear axle.

In the first embodiment, the active stabilizer 50F functions as a second roll stiffness varying device that varies the roll stiffness of the front axle. As shown in FIG. 1, when a rightward lateral acceleration acts on the vehicle 10, a downward control force Ffl is applied to the left front wheel 14FL and an upward control force Ffr is applied to the right front wheel 14FR by the electric actuator 54F applying torsion between the left and right stabilizer bars. By applying vertical forces in opposite phases to the left and right wheels 14FL and 14FR of the front axle in this way, the roll stiffness of the front axle can be increased with respect to the lateral acceleration acting on the vehicle 10.

The control forces Ffl and Ffr applied to the left and right wheels 14FL and 14FR of the front axle by the active stabilizer 50F are increased in accordance with the lateral acceleration acting on the gravity center 11 of the vehicle 10. Typically, the control forces Ffl and Ffr are increased in proportion to the lateral acceleration. In FIG. 1, the lengths of the arrows indicating the directions of the control forces Ffl and Ffr indicate the magnitudes of the control forces Ffl and Ffr.

In the first embodiment, when the vehicle 10 turns, the roll stiffnesses of the front axle and the rear axle are increased by the active suspensions 20RRA and 20RLA and the active stabilizer 50F, so that the roll of the vehicle 10 can be suppressed. However, when the active suspensions 20RRA and 20RLA are compared with the active stabilizer 50F, the control force that can be output is smaller in the active stabilizer 50F. That is, the roll stiffness of the front axle achieved by the active stabilizer 50F is suppressed to be lower than the roll stiffness of the rear axle achieved by the active suspensions 20RRA and 20RLA. Therefore, as the lateral acceleration acting on the vehicle 10 increases and the roll stiffnesses of the front axle and the rear axle are increased, the roll stiffness distribution ratio of the rear axle increases.

An imbalance in the roll stiffness distribution between the front axle and the rear axle leads to instability of the vehicle behavior in the vicinity of the critical region. Therefore, in the vehicle roll control according to the first embodiment, the increase in the control amount given to the actuators 26RL and 26RR from a controller described later is suppressed so that the roll stiffness of the rear axle does not become excessively high when the imbalance in the roll stiffness distribution may occur.

The control forces Frl and Frr applied to the left and right wheels 14RL and 14RR of the rear axle by the actuators 26RL and 26RR are typically proportional to control amounts applied from the controller to the actuators 26RL and 26RR. The control amounts applied to the actuators 26RL and 26RR are typically calculated by multiplying the lateral acceleration acting on the vehicle 10 by the control gains.

Figure 2:
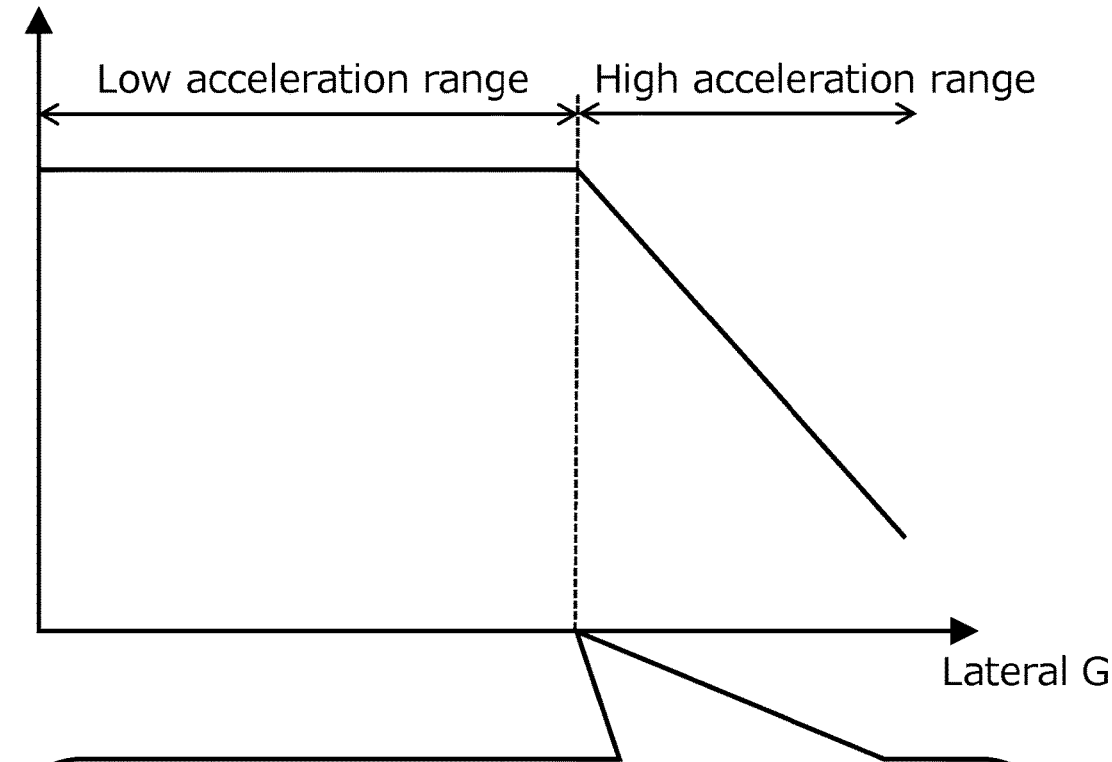
FIG. 2 is a diagram showing an example of setting control gains for a lateral acceleration according to the first embodiment of the present disclosure.

In the vehicle roll control according to the first embodiment, the control gains of the actuators 26RL and 26RR are set with respect to the lateral acceleration as shown in FIG. 2. Specifically, in a low acceleration range where the lateral acceleration is relatively low, the control gains are held constant. When the lateral acceleration increases to a high acceleration range beyond the low acceleration range, the control gains are decreased in accordance with the increase in the lateral acceleration. The high acceleration range is a range in which imbalance in roll stiffness distribution can occur unless any measures are taken. In the high acceleration range, the control gains are gradually reduced in accordance with the increase in the lateral acceleration so that roll stiffness distribution ratio of the rear axle does not exceed an upper limit value. By gradually reducing the control gains instead of reducing the control gains stepwise, disturbance in the behavior of the vehicle 10 due to a rapid increase in the roll angle can be suppressed.

In the graph shown in FIG. 2, the threshold lateral acceleration separating the low acceleration range and the high acceleration range may be a predetermined adaptive value based on a test or a simulation. Further, when any of the suspensions 20FL, 20FR, 20RLA, and 20RRA hits a bound stopper or shrinks to the vicinity of the bound stopper, the lateral acceleration at that time may be regarded as the threshold lateral acceleration to switch from the low acceleration range to the high acceleration range. Whether or not the suspension hits the bound stopper may be detected by a sensor, or may be determined from a measured value of the stroke of the suspension. By reducing the control amounts immediately before or after the suspension hits the bound stopper, it is possible to prevent a rapid increase in the roll angle due to the reduction in the control amounts. Further, when the roll stiffness distribution ratio of the rear axle reaches a predetermined upper limit value, or when the load transfer amount from the front axle to the rear axle reaches a predetermined upper limit value, the lateral acceleration at that time may be regarded as the threshold lateral acceleration, and the low acceleration range may be switched to the high acceleration range. The roll stiffness distribution ratio and the load transfer amount can be obtained by calculation based on sensor values.

As described above, the vehicle roll control according to the first embodiment is performed on the vehicle 10 provided with the pair of left and right active suspensions 20RRA and 20RLA on the rear axle and the active stabilizer 50F on the front axle. According to the vehicle roll control according to the first embodiment, when the vehicle 10 turns, the imbalance in the roll stiffness distribution due to the difference between the roll stiffness of the front axle and the roll stiffness of the rear axle is prevented from progressing, and the behavior of the vehicle 10 is prevented from becoming unstable due to oversteer in the vicinity of the critical region.

1-2. Vehicle Roll Control Apparatus

Figure 3:
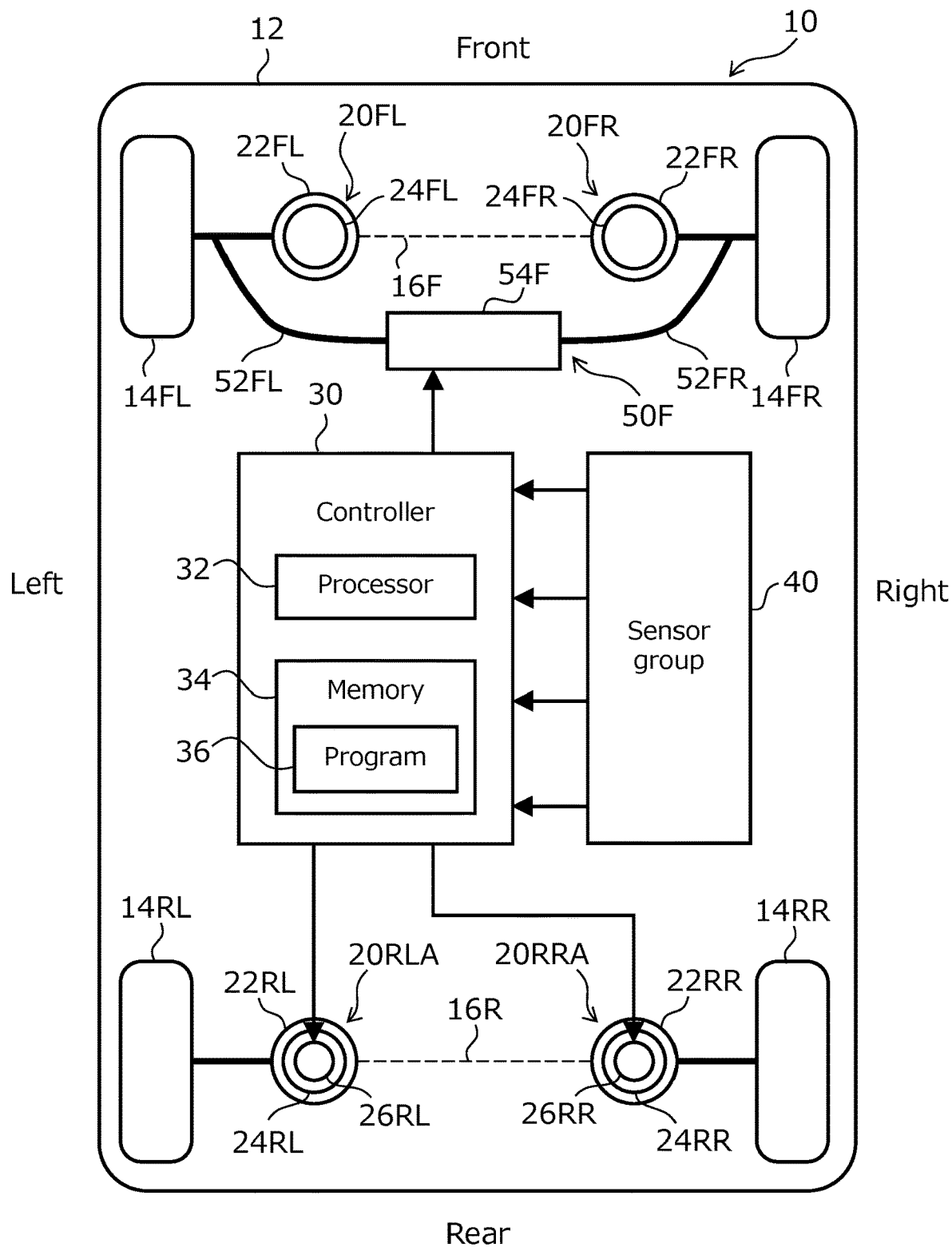
FIG. 3 is a diagram showing a configuration of a vehicle on which a vehicle roll control apparatus according to the first embodiment of the present disclosure is mounted.

Next, a vehicle roll control apparatus for executing the above-described vehicle roll control will be described with reference to FIG. 3. FIG. 3 shows a configuration of the vehicle 10 on which the vehicle roll control apparatus according to the first embodiment is mounted.

As shown in FIG. 3, the front axle 16F is provided with the left front wheel 14FL and the right front wheel 14FR which are steered wheels, and the rear axle 16R is provided with the left rear wheel 14RL and the right rear wheel 14RR which are non-steered wheels. The left and right wheels 14FL and 14FR of the front axle 16F are suspended from the vehicle body 12 by the suspensions 20FL and 20FR. The left and right wheels 14RL and 14RR of the rear axle 16R are suspended from the vehicle body 12 by the active suspensions 20RLA and 20RRA. The vehicle 10 may be a front-wheel drive automobile that drives the front wheels 14FL and 14FR, a rear-wheel drive automobile that drives the rear wheels 14RL and 14RR, or an all-wheel drive automobile that drives the front wheels 14FL and 14FR and the rear wheels 14RL and 14RR.

The left and right suspensions 20FL and 20FR of the front axle 16F, which are non-active suspensions, include springs 22FL and 22FR and shock absorbers 24FL and 24FR. The left and right active suspensions 20RLA and 20RRA of the rear-axle 16R include the actuators 26RL and 26RR in addition to springs 22RL and 22RR and shock absorbers 24RL and 24RR. The actuators 26RL and 26RR are provided between the vehicle body 12 and the piston rods of the shock absorbers 24RL and 24RR. The actuators 26RL and 26RR are configured to hydraulically or electromagnetically generate vertical control forces Frl and Frr between the vehicle body 12 and the left and right wheels 14RL and 14RR of the rear axle 16R.

The vehicle 10 is provided with the active stabilizer 50F on the front axle 16F. The active stabilizer 50F include the electric actuator 54F in addition to a left stabilizer bar 52FL and a right stabilizer bar 52FR. The left stabilizer bar 52FL is connected to the suspension 20FL of the left front wheel 14FL. The right stabilizer bar 52FR is connected to the suspension 20FR of the right front wheel 14FR. The electric actuator 54F connect the left stabilizer bar 52FL and the right stabilizer bar 52FR so as to be rotatable relative to each other. By relatively rotating the left and right stabilizer bars 52FL and 52FR by the electric actuator 54F, control forces Ffl and Ffr having directions and strengths corresponding to the rotation angle are generated between the vehicle body 12 and the left and right wheels 14FL and 14FR of the front axle 16F.

A controller 30 is mounted on the vehicle 10. The controller 30 is connected to a sensor group 40 mounted on the vehicle 10 via an in-vehicle network such as a controller area network (CAN). The controller 30 obtains signals from the sensor group 40. The sensor group 40 includes sensors that measure physical quantities related to the behavior of the vehicle 10, such as an acceleration sensor, a vehicle height sensor, and a wheel speed sensor.

The controller 30 is connected to the actuators 26RL and 26RR and the electric actuator 54F via the in-vehicle network. Control amounts for causing vertical control forces Frl and Frr to act between the vehicle body 12 and the left and right wheels 14RL and 14RR of the rear axle 16R are given from the controller 30 to the actuators 26RL and 26RR. Further, a control amount for causing vertical control forces Ffl and Ffr to act between the vehicle body 12 and the left and right wheels 14FL and 14FR of the front axle 16F is given from the controller 30 to the electric actuator 54F.

The controller 30 includes a processor 32 and a memory 34 coupled to the processor 32. The memory 34 stores a program 36 executable by the processor 32 and various information related to the program 36. The program 36 stored in the memory 34 include a vehicle roll control program. In the first embodiment, the vehicle roll control program is executed by the processor 32, whereby the vehicle roll control described in "1-1. Vehicle Roll Control" is achieved.

Figure 4:
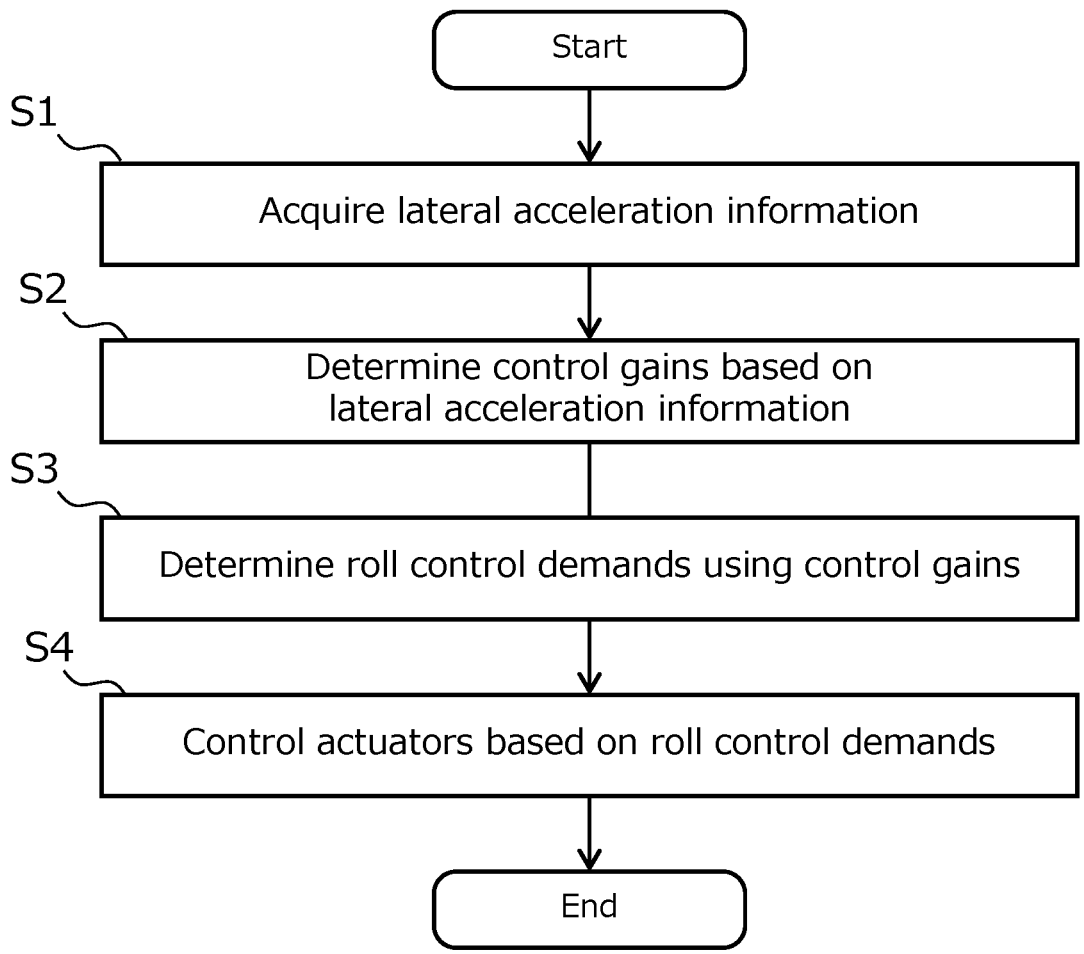
FIG. 4 is a flowchart of vehicle roll control according to the first embodiment of the present disclosure.

FIG. 4 is a flowchart of vehicle roll control performed by the controller 30 when the vehicle roll control program is executed by the processor 32. This flowchart is also applied to vehicle roll control executed in other embodiments described later.

First, in step S1, the controller 30 acquires information (lateral acceleration information) on the lateral acceleration acting on the vehicle 10 by the sensor group 40. The lateral acceleration information may be a sensor value measured by an acceleration sensor, may be an estimated value calculated from a steering angle and a vehicle speed, or may be an estimated value calculated from a curvature and bank angle of a curve acquired from map information and a vehicle speed. Further, instead of the lateral acceleration itself acting on the vehicle 10, a measured value or estimated value of a physical quantity correlated with the lateral acceleration may be used.

In step S2, the controller 30 determines control gains of the actuators 26RL and 26RR based on the lateral acceleration information. When the lateral acceleration increases to the high acceleration range, the controller 30 gradually decreases the control gains of the actuators 26RL and 26RR in accordance with the increase in the lateral acceleration. On the other hand, the control gain of the electric actuators 54F is kept constant regardless of the lateral acceleration.

In step S3, the controller 30 determines roll control demands using the control gains determined in step S2. A roll control demand means a control amount required for vehicle roll control. Typically, the roll control demand is calculated by multiplying the lateral acceleration by a control gain. The roll control demands for the actuators 26RL and 26RR are determined using the control gains determined according to the lateral acceleration. Since the control gains of the actuators 26RL and 26RR are set as shown in FIG. 2, the roll control demands in the low acceleration range are proportional to the lateral acceleration, but the roll control demands in the high acceleration range are not proportional to the lateral acceleration, so that the increase in the roll control demands with respect to the lateral acceleration is suppressed. On the other hand, since the control gain of the electric actuator 54F is kept constant regardless of the lateral acceleration, the roll control demand for the electric actuator 54F is determined so as to be proportional to the lateral acceleration in the entire range.

In step S4, the controller 30 controls the actuators 26RL and 26RR and the electric actuator 54F based on the roll control demands determined in step S3. As a result, the roll stiffness of the rear axle 16R is increased by the active suspensions 20RLA and 20RRA, and the roll stiffness of the front axle 16F is increased by the active stabilizer 50F. When the lateral acceleration increases to the high acceleration range beyond the low acceleration range, the control gains of the actuators 26RL and 26RR are reduced in accordance with the increase in the lateral acceleration so that the roll stiffness distribution ratio of the rear axle 16R does not exceed the upper limit value. As a result, the imbalance in the roll stiffness distribution due to the difference between the roll stiffness of the rear axle 16R and the roll stiffness of the front axle 16F is suppressed from progressing, and the behavior of the vehicle 10 is suppressed from becoming unstable in the vicinity of the critical region.

2. Second Embodiment

2-1. Vehicle Roll Control

Figure 5:
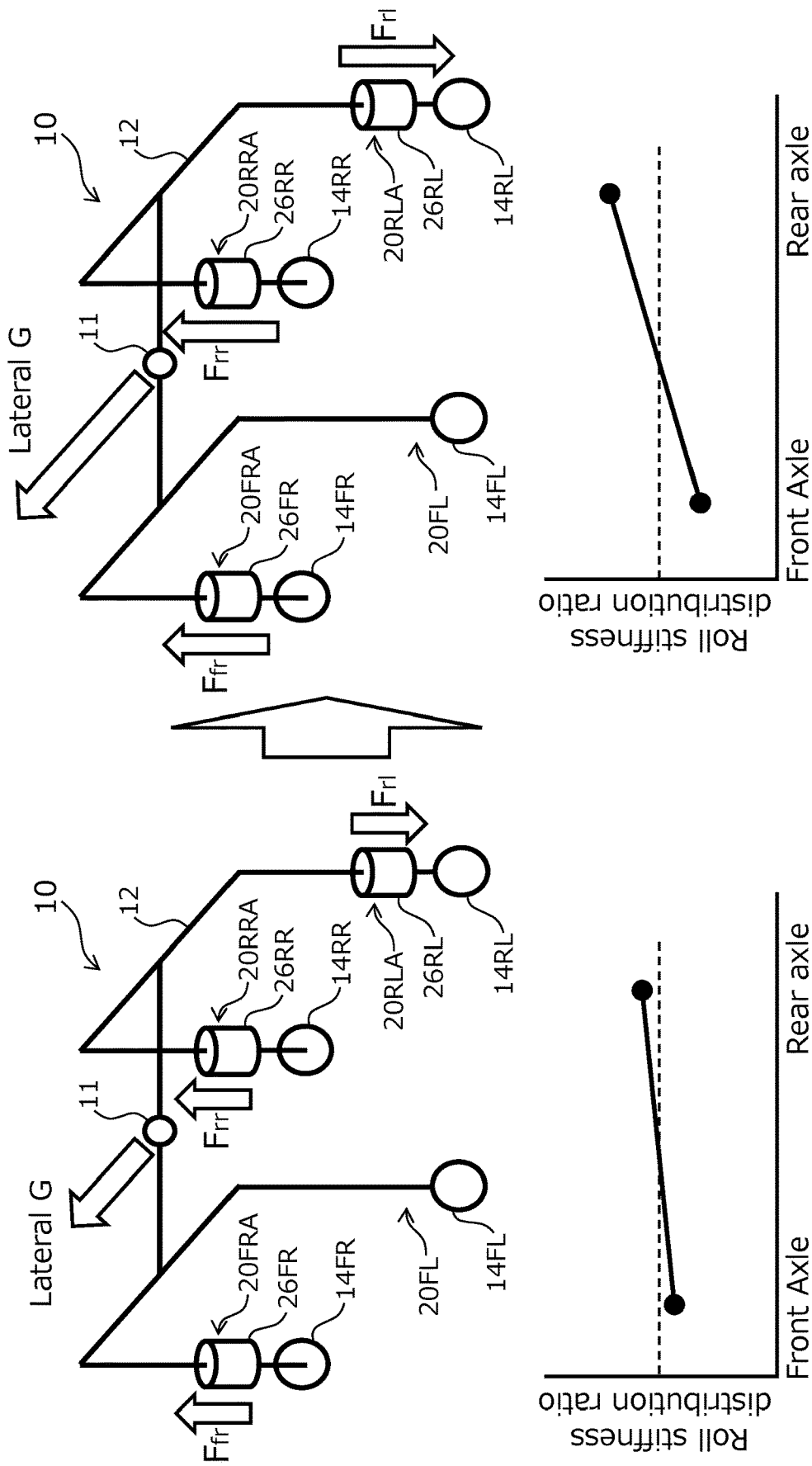
FIG. 5 is a conceptual diagram of vehicle roll control according to a second embodiment of the present disclosure.

The vehicle roll control according to the second embodiment will be described with reference to FIG. 5. FIG. 5 is a conceptual diagram of the vehicle roll control according to the second embodiment. The conceptual diagram shown in FIG. 5 shows a modeled vehicle 10, a lateral acceleration acting on the gravity center 11 of the vehicle 10, and control forces for roll suppression applied by a roll stiffness varying device. A state in which the lateral acceleration is low is shown on the left side of FIG. 5, and a state in which the lateral acceleration is increased is shown on the right side of FIG. 5. FIG. 5 also contains a graph showing a change in roll stiffness distribution ratio between the front axle and the rear axle before and after the lateral acceleration increases.

The vehicle 10 shown in FIG. 5 includes a pair of left and right active suspensions 20RLA and 20RRA suspending left and right wheels 14RL and 14RR of a rear axle (first axle), and an active suspension 20FRA suspending a right wheel 14FR of a front axle (second axle). Specifically, the active suspensions 20RLA, 20RRA, and 20FRA of the second embodiment are so-called full-active suspensions that can actively apply vertical control forces between the vehicle body 12 and the wheels 14RL, 14RR, and 14FR by actuators 26RL, 26RR, and 26FR. A suspension 20FL suspending a left wheel 14FL of the front axle is a general suspension without an actuator, that is, a non-active suspension.

In the second embodiment, the pair of left and right active suspensions 20RLA and 20RRA of the rear axle function as a first roll stiffness varying device that varies the roll stiffness of the rear axle. As shown in FIG. 5, when a rightward lateral acceleration acts on the vehicle 10, a downward control force Frl is applied to the left rear wheel 14RL by the actuator 26RL, and an upward control force Frr is applied to the right rear wheel 14RR by the actuator 26RR. By applying vertical forces in opposite phases to the left and right wheels 14RL and 14RR of the rear axle in this way, the roll stiffness of the rear axle can be increased with respect to the lateral acceleration acting on the vehicle 10.

Further, in the second embodiment, the single active suspension 20FRA of the front axle functions as a second roll stiffness varying device that varies the roll stiffness of the front axle. As shown in FIG. 5, when a rightward lateral acceleration acts on the vehicle 10, an upward control force Ffr is applied to the right front wheel 14FR by the actuator 26FR. By applying an upward force to the wheel 14FR on one side of the front axle in this way, it is possible to increase the roll stiffness of the front axle with respect to the lateral acceleration acting on the vehicle 10.

The control forces Frl and Frr applied by the actuators 26RL and 26RR to the left and right wheels 14RL and 14RR of the rear axle and the control force Ffr applied by the actuator 26FR to the right front wheel 14FR are increased in accordance with the lateral acceleration acting on the gravity center 11 of the vehicle 10. Typically, the control forces Frl, Frr, and Ffr are increased in proportion to the lateral acceleration. In FIG. 5, the length of the arrow line indicating the direction of the lateral acceleration indicates the magnitude of the lateral acceleration, and the lengths of the arrow lines indicating the direction of the control forces Frl, Frr, and Ffr indicate the magnitudes of the control forces Frl, Frr, and Ffr.

In the second embodiment, when the vehicle 10 turns, the roll stiffnesses of the front axle and the rear axle are increased by the front and rear active suspensions 20RLA, 20RRA, and 20FRA, so that the roll of the vehicle 10 can be suppressed. However, when the pair of left and right active suspensions 20RLA and 20RRA of the rear axle and the single active suspension 20FRA of the front axle are compared, the control force that can be output is smaller in the single active suspension 20FRA of the front axle. That is, the roll stiffness of the front axle achieved by the single active suspension 20FRA is suppressed to be lower than the roll stiffness of the rear axle achieved by the pair of left and right active suspensions 20RLA and 20RRA. Therefore, as the lateral acceleration acting on the vehicle 10 increases and the roll stiffnesses of the front axle and the rear axle are increased, the roll stiffness distribution ratio of the rear axle increases.

An imbalance in the roll stiffness distribution between the front axle and the rear axle leads to instability of the vehicle behavior in the vicinity of the critical region. Therefore, in the vehicle roll control according to the second embodiment, the increase in the control amounts given to the actuators 26RL and 26RR from a controller described later is suppressed so that the roll stiffness of the rear axle does not become excessively high when the imbalance in the roll stiffness distribution may occur.

As a method of suppressing the increase in the control amounts, in the vehicle roll control according to the second embodiment, the control gains of the actuators 26RL and 26RR are set with respect to the lateral acceleration as shown in FIG. 2 described above. Specifically, in the low acceleration range where the lateral acceleration is relatively low, the control gains of the actuators 26RL and 26RR are held constant. When the lateral acceleration increases to the high acceleration range beyond the low acceleration range, the control gains of the actuators 26RL and 26RR are gradually reduced in accordance with the increase in the lateral acceleration. An example of setting the threshold lateral acceleration for separating the low acceleration range and the high acceleration range is as described in the first embodiment. On the other hand, the control gain of the actuator 26FR of the front axle is kept constant regardless of the lateral acceleration.

As described above, the vehicle roll control according to the second embodiment is performed on the vehicle 10 provided with the pair of left and right active suspensions 20RLA and 20RRA on the rear axle and the single active suspension 20FRA on the front axle. According to the vehicle roll control according to the second embodiment, when the vehicle 10 turns, the imbalance in the roll stiffness distribution due to the difference between the roll stiffness of the front axle and the roll stiffness of the rear axle is suppressed from progressing, and the behavior of the vehicle 10 is suppressed from becoming unstable due to oversteer in the vicinity of the critical region.

2-2. Vehicle Roll Control Apparatus

Figure 6:
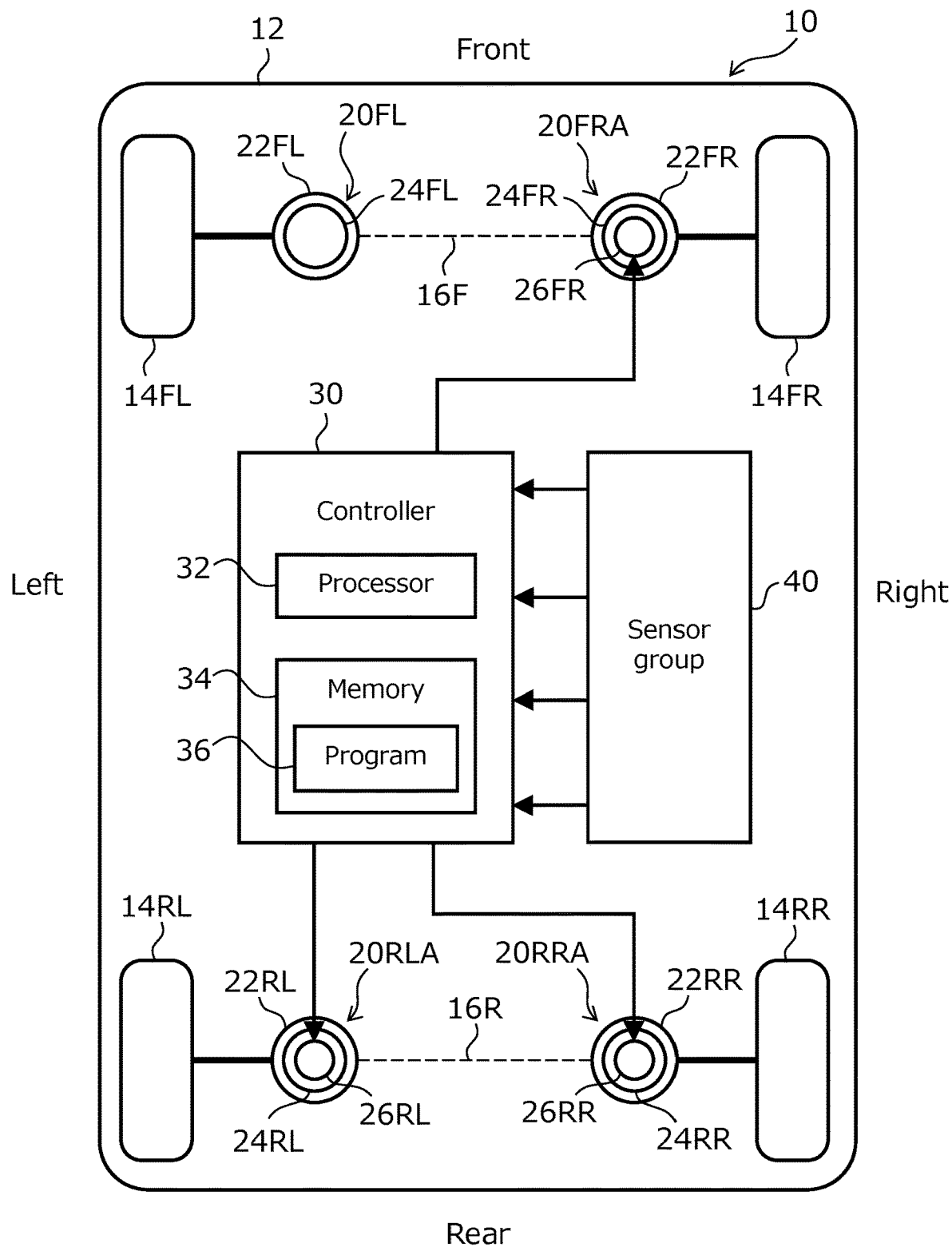
FIG. 6 is a diagram showing a configuration of a vehicle on which a vehicle roll control apparatus according to the second embodiment of the present disclosure is mounted.

Next, a vehicle roll control apparatus for executing the above-described vehicle roll control will be described with reference to FIG. 6. FIG. 6 shows a configuration of the vehicle 10 on which the vehicle roll control apparatus according to the second embodiment is mounted. In FIG. 6, elements common to those of the first embodiment shown in FIG. 3 are denoted by common reference numerals. The description of elements of the vehicle 10 shown in FIG. 6 that have already been described in the first embodiment will be simplified or omitted.

As shown in FIG. 6, the left wheel 14FL of the front axle 16F is suspended from the vehicle body 12 by the suspension 20FL. The left and right wheels 14RL and 14RR of the rear axle 16R and the right wheel 14FR of the front axle 16F are suspended from the vehicle body 12 by the active suspensions 20RLA, 20RRA, and 20FRA.

The suspension 16F on the left side of the front axle 20FL, which is a non-active suspension, includes a spring 22FL and a shock absorber 24FL. The left and right active suspensions 20RLA and 20RRA of the rear-axle 16R include the actuators 26RL and 26RR in addition to springs 22RL and 22RR and shock absorbers 24RL and 24RR. The actuators 26RL and 26RR are provided between the vehicle body 12 and the piston rods of the shock absorbers 24RL and 24RR. The actuators 26RL and 26RR are configured to hydraulically or electromagnetically generate vertical control forces between the vehicle body 12 and the left and right wheels 14RL and 14RR of the rear axle 16R.

The active suspension 20FRA on the right side of the front axle 16F includes the actuator 26FR in addition to a spring 22FR and a shock absorber 24FR. The actuator 26FR are provided between the vehicle body 12 and the piston rod of the shock absorber 24FR. The actuators 26FR have the same configuration as the actuators 26RL and 26RR, and are configured to hydraulically or electromagnetically generate a vertical control force between the vehicle body 12 and the right front wheel 14FR.

The controller 30 is connected to the actuators 26RL, 26RR, and 26FR via an in-vehicle network. Control amounts for causing the vertical control forces Frl and Frr to act between the vehicle body 12 and the left and right wheels 14RL and 14RR of the rear axle 16R are given from the controller 30 to the actuators 26RL and 26RR. Further, a control amount for causing the vertical control force Ffr to act between the vehicle body 12 and the right wheel 14FR of the front axle 16F is given from the controller 30 to the actuator 26FR. In the second embodiment, the vehicle roll control program included in the program 36 is executed by the processor 32, whereby the vehicle roll control described in "2-1. Vehicle Roll control" is achieved.

3. Third Embodiment 3-1. Vehicle Roll Control

Figure 7:
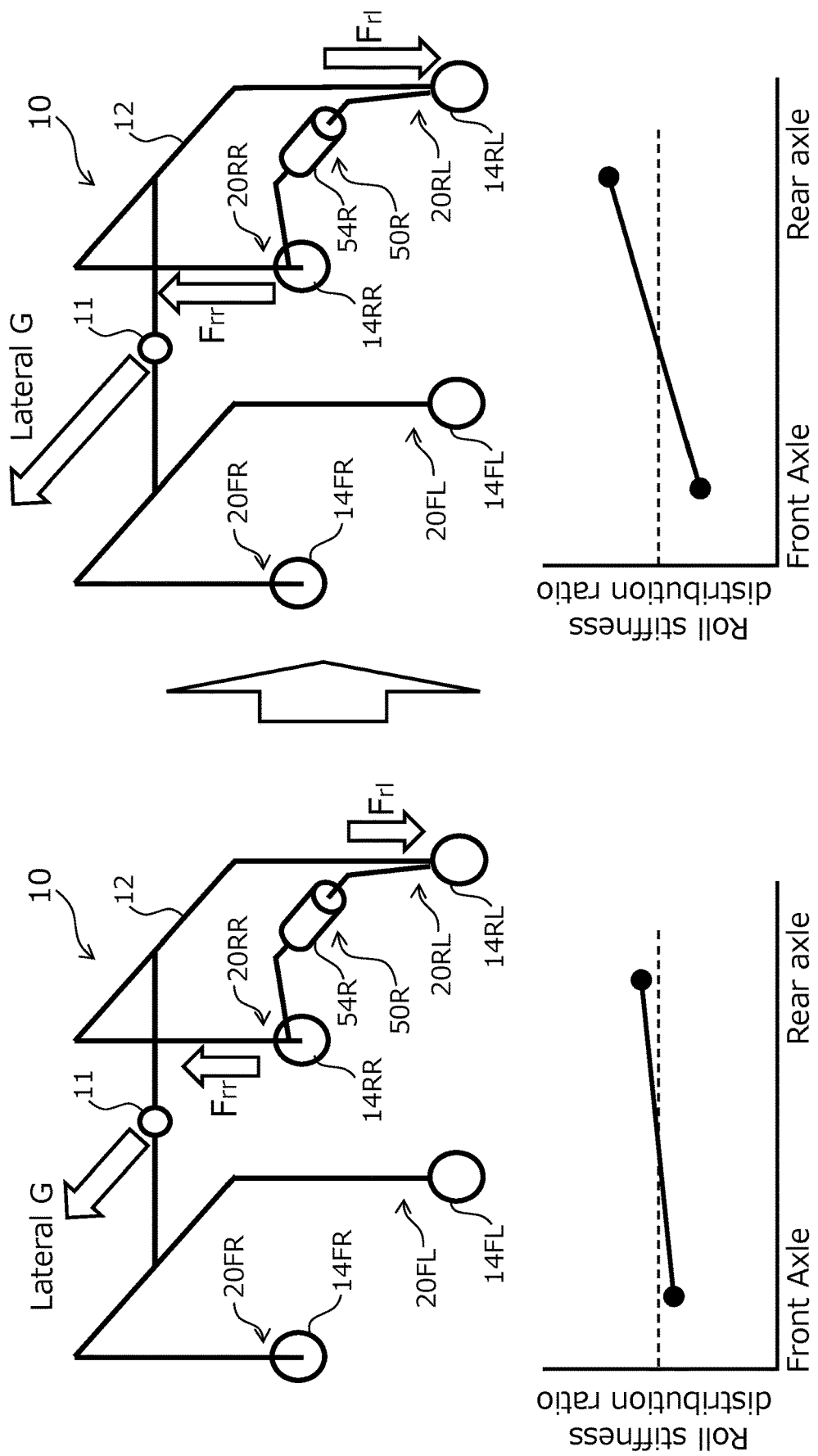
FIG. 7 is a conceptual diagram of vehicle roll control according to a third embodiment of the present disclosure.

The vehicle roll control according to the third embodiment will be described with reference to FIG. 7. FIG. 7 is a conceptual diagram of the vehicle roll control according to the third embodiment. The conceptual diagram shown in FIG. 7 shows a modeled vehicle 10, a lateral acceleration acting on the gravity center 11 of the vehicle 10, and control forces for roll suppression applied by a roll stiffness varying device. A state in which the lateral acceleration is low is shown on the left side of FIG. 7, and a state in which the lateral acceleration is increased is shown on the right side. FIG. 7 also contains a graph showing a change in the roll stiffness distribution ratio between the front axle and the rear axle before and after the lateral acceleration increases.

The vehicle 10 shown in FIG. 7 includes a pair of left and right suspensions 20RL and 20RR suspending left and right wheels 14RL and 14RR of a rear axle (first axle), and suspensions 20FL and 20FR suspending left and right wheels 14FL and 14FR of a front axle (second axle). These suspensions 20RL, 20RR, 20FL, and 20FR are general suspensions without actuators, that is, non-active suspensions.

The vehicle 10 shown in FIG. 7 includes an active stabilizer 50R that connect left and right suspensions 20RL and 20RR of the rear axle. The active stabilizer 50R includes an electric actuator 54R that can actively apply torsion between the left and right stabilizer bars. The vehicle 10 does not include an active stabilizer on the front axle. However, a general stabilizer not including an electric actuator may be provided on the front axle.

In the third embodiment, the active stabilizer 50R functions as a first roll stiffness varying device that varies the roll stiffness of the rear axle. As shown in FIG. 7, when a rightward lateral force acts on the vehicle 10, the electric actuator 54R applies a torsion between the left and right stabilizer bars, whereby a downward control force Frl is applied to the left rear wheel 14RL, and an upward control force Frr is applied to the right rear wheel 14RR. By applying vertical forces in opposite phases to the left and right wheels 14RL and 14RR of the rear axle in this way, the roll stiffness of the rear axle can be increased with respect to the lateral acceleration acting on the vehicle 10.

The control forces Frl and Frr applied to the left and right wheels 14RL and 14RR of the rear axle by the active stabilizer 50R are increased in accordance with the lateral acceleration acting on the gravity center 11 of the vehicle 10. Typically, the control forces Frl and Frr are increased in proportion to the lateral acceleration. In FIG. 7, the lengths of the arrows indicating the directions of the control forces Frl and Frr indicate the magnitudes of the control forces Frl and Frr.

In the third embodiment, when the vehicle 10 turns, the roll stiffness of the rear axle can be increased by the active stabilizer 50R to suppress the roll of the vehicle 10. However, if the roll stiffness of the rear axle is excessively increased, the roll stiffness distribution ratio is biased toward the rear axle. An imbalance in the roll stiffness distribution between the front axle and the rear axle leads to instability of the vehicle behavior in the vicinity of the critical region. Therefore, in the vehicle roll control according to the third embodiment, an increase in the control amount given to the electric actuator 54R of the active stabilizer 50R from a controller described later is suppressed so that the roll stiffness of the rear axle does not become excessively high when the imbalance in the roll stiffness distribution may occur.

As a method for suppressing the increase in the control amount, in the vehicle roll control according to the third embodiment, the control gain of the electric actuator 54R is set with respect to the lateral acceleration as shown in FIG. 2 described above. Specifically, in the low acceleration range where the lateral acceleration is relatively low, the control gain of the electric actuator 54R is kept constant. When the lateral acceleration increases to the high acceleration range beyond the low acceleration range, the control gain of the electric actuator 54R is gradually reduced in accordance with the increase in the lateral acceleration. An example of setting the threshold lateral acceleration for separating the low acceleration range and the high acceleration range is as described in the first embodiment.

As described above, the vehicle roll control according to the third embodiment is performed on the vehicle 10 provided with the active stabilizer 50R on the rear axle. According to the vehicle roll control according to the third embodiment, when the vehicle 10 turns, the imbalance in the roll stiffness distribution due to the difference between the roll stiffness of the front axle and the roll stiffness of the rear axle is suppressed from progressing, and the behavior of the vehicle 10 is suppressed from becoming unstable due to oversteer in the vicinity of the critical region.

3-2. Vehicle Roll Control Apparatus

Figure 8:
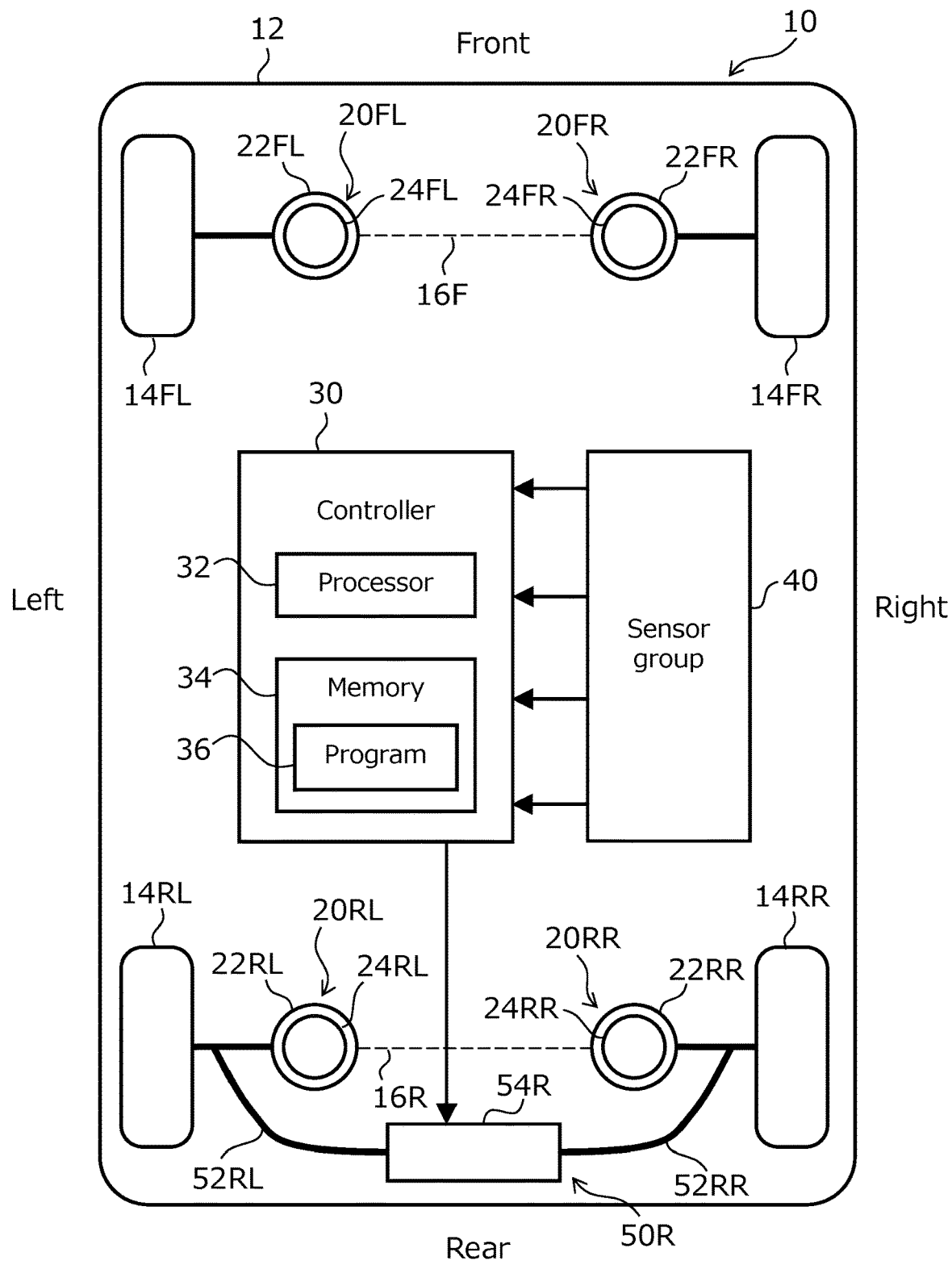
FIG. 8 is a diagram showing a configuration of a vehicle on which a vehicle roll control apparatus according to the third embodiment of the present disclosure is mounted.

Next, a vehicle roll control apparatus for executing the above-described vehicle roll control will be described with reference to FIG. 8. FIG. 8 shows a configuration of the vehicle 10 on which the vehicle roll control apparatus according to the third embodiment is mounted. In FIG. 8, elements common to those of the first embodiment shown in FIG. 3 are denoted by common reference numerals. The description of elements of the vehicle 10 shown in FIG. 8 that have already been described in the first embodiment will be simplified or omitted.

As shown in FIG. 8, the wheels 14FL, 14FR, 14RL, and 14RR are suspended from the vehicle body 12 by the suspensions 20FL, 20FR, 20RL, and 20RR. The suspensions 20FL, 20FR, 20RL, and 20RR are non-active suspensions without actuators.

The vehicle 10 is equipped with the active stabilizer 50R on the rear axle 16R. The active stabilizer 50R includes the electric actuator 54R in addition to a left stabilizer bar 52RL and a right stabilizer bar 52RR. The left stabilizer bar 52RL is connected to the suspension 20RL of the left rear wheel 14RL. The right stabilizer bar 52RR is connected to the suspension 20RR of the right rear wheel 14RR. The electric actuator 54R connects the left stabilizer bar 52RL and the right stabilizer bar 52RR so as to be rotatable relative to each other. By relatively rotating the left and right stabilizer bars 52RL and 52RR by the electric actuator 54R, control forces Frl and Frr having directions and strengths corresponding to the rotation angle are generated between the vehicle body 12 and the left and right wheels 14RL and 14RR of the rear axle 16R.

The controller 30 is connected to the electric actuator 54R via an in-vehicle network. A control amount for causing vertical control forces Frl and Frr to act between the vehicle body 12 and the left and right wheels 14RL and 14RR of the rear axle 16R is given from the controller 30 to the electric actuator 54R. In the third embodiment, the vehicle roll control program included in the program 36 is executed by the processor 32, whereby the vehicle roll control described in "3-1. Vehicle Roll control" is achieved.

4. Fourth Embodiment 4-1. Vehicle Roll Control

Figure 9:
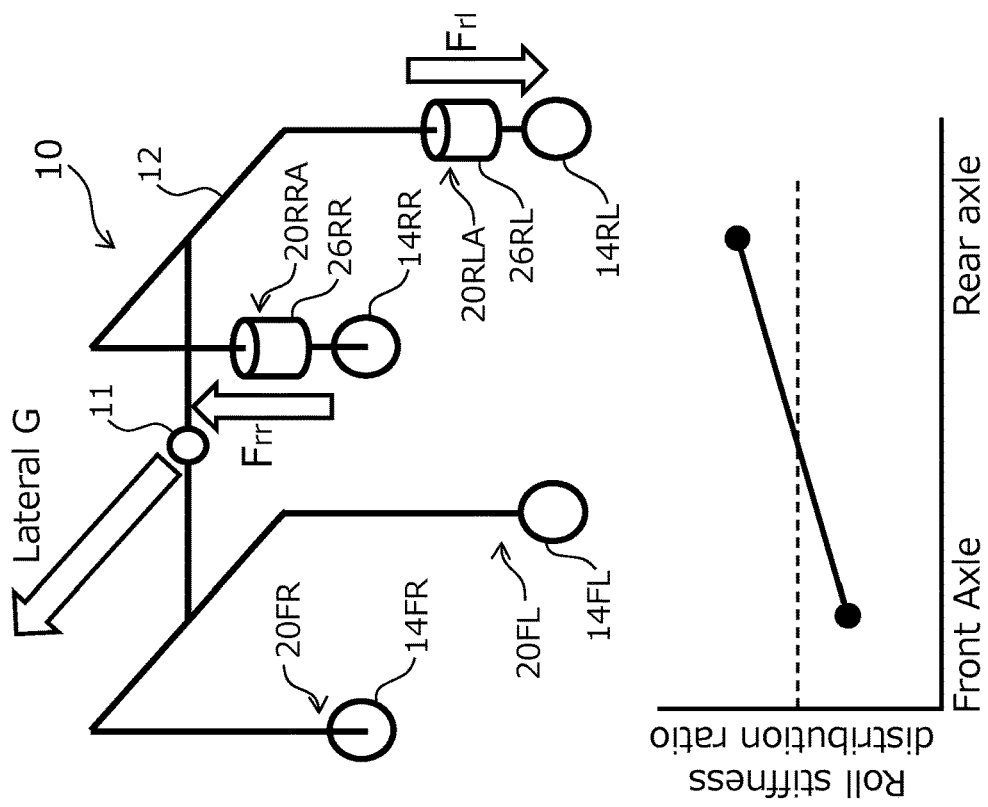
FIG. 9 is a conceptual diagram of vehicle roll control according to a fourth embodiment of the present disclosure.
Figure 9:
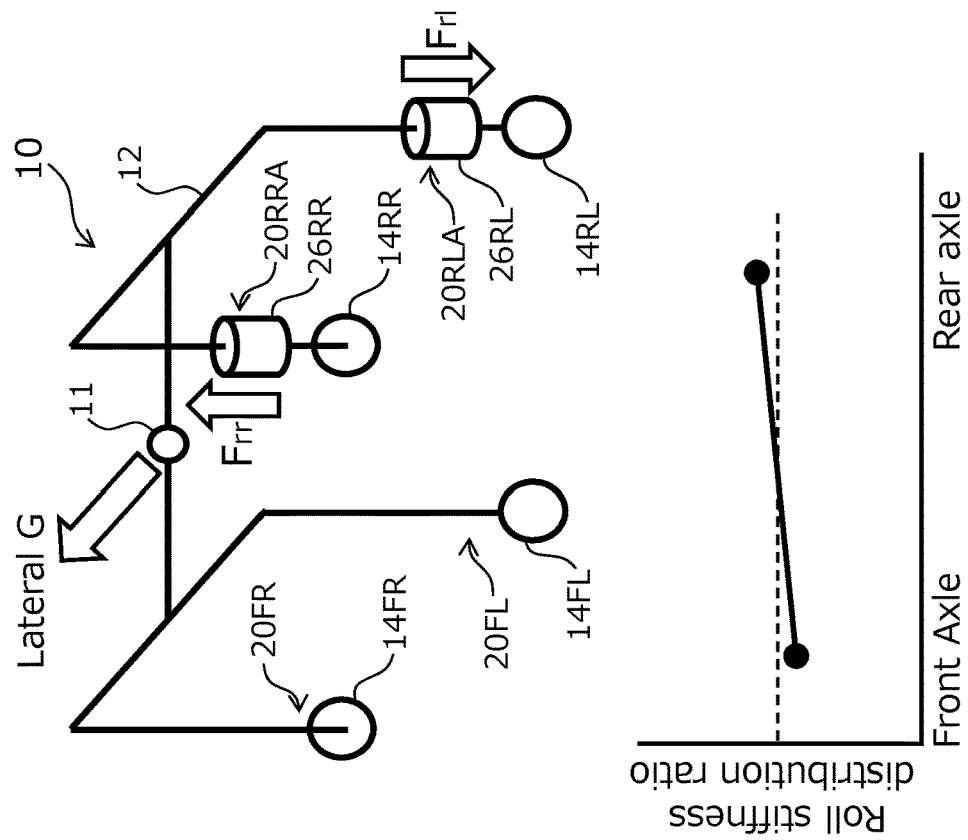

The vehicle roll control according to the fourth embodiment will be described with reference to FIG. 9. FIG. 9 is a conceptual diagram of the vehicle roll control according to the fourth embodiment. The conceptual diagram shown in FIG. 9 shows a modeled vehicle 10, a lateral acceleration acting on the gravity center 11 of the vehicle 10, and control forces for roll suppression applied by a roll stiffness varying device. A state in which the lateral acceleration is low is shown on the left side of FIG. 9, and a state in which the lateral acceleration is increased is shown on the right side. FIG. 9 also contains a graph showing a change in the roll stiffness distribution ratio between the front axle and the rear axle before and after the lateral acceleration increases.

The vehicle 10 shown in FIG. 9 includes a pair of left and right active suspensions 20RLA and 20RRA suspending left and right wheels 14RL and 14RR of a rear axle (first axle). Specifically, the active suspensions 20RLA and 20RRA of the fourth embodiment are so-called full-active suspensions that can actively apply vertical control forces between the vehicle body 12 and the wheels 14RL and 14RR by actuators 26RL and 26RR. The suspensions 20FL and 20FR suspending the left and right wheels 14FL and 14FR of the front axle (second axle) are general suspensions without actuators, that is, non-active suspensions.

In the fourth embodiment, the pair of left and right active suspensions 20RLA and 20RRA of the rear axle function as a first roll stiffness varying device that varies the roll stiffness of the rear axle. As shown in FIG. 9, when a rightward lateral acceleration acts on the vehicle 10, a downward control force Frl is applied to the left rear wheel 14RL by the actuator 26RL, and an upward control force Frr is applied to the right rear wheel 14RR by the actuator 26RR. By applying vertical forces in opposite phases to the left and right wheels 14RL and 14RR of the rear axle in this way, the roll stiffness of the rear axle can be increased with respect to the lateral acceleration acting on the vehicle 10.

The control forces Frl and Frr applied by the actuators 26RL and 26RR to the left and right wheels 14RL and 14RR of the rear axle are increased in accordance with the lateral acceleration acting on the gravity center 11 of the vehicle 10. Typically, the control forces Frl and Frr are increased in proportion to the lateral acceleration. In FIG. 9, the length of the arrow line indicating the direction of the lateral acceleration indicates the magnitude of the lateral acceleration, and the lengths of the arrow lines indicating the direction of the control forces Frl and Frr indicate the magnitudes of the control forces Frl and Frr.

In the fourth embodiment, when the vehicle 10 turns, the roll stiffness of the rear axle is increased by the active suspensions 20RLA and 20RRA of the rear axle, so that the roll of the vehicle 10 can be suppressed. However, if the roll stiffness of the rear axle is excessively increased, the roll stiffness distribution ratio is biased toward the rear axle. An imbalance in the roll stiffness distribution between the front axle and the rear axle leads to instability of the vehicle behavior in the vicinity of the critical region. Therefore, in the vehicle roll control according to the fourth embodiment, the increase in the control amounts given to the actuators 26RL and 26RR from a controller described later is suppressed so that the roll stiffness of the rear axle does not become excessively high when the imbalance in the roll stiffness distribution may occur.

As a method of suppressing the increase in the control amounts, in the vehicle roll control according to the fourth embodiment, the control gains of the actuators 26RL and 26RR are set with respect to the lateral acceleration as shown in FIG. 2 described above. Specifically, in the low acceleration range where the lateral acceleration is relatively low, the control gains of the actuators 26RL and 26RR are held constant. When the lateral acceleration increases to the high acceleration range beyond the low acceleration range, the control gains of the actuators 26RL and 26RR are gradually reduced in accordance with the increase in the lateral acceleration. An example of setting the threshold lateral acceleration for separating the low acceleration range and the high acceleration range is as described in the first embodiment.

As described above, the vehicle roll control according to the fourth embodiment is performed on the vehicle 10 provided with the pair of left and right active suspensions 20RLA and 20RRA on the rear axle. According to the vehicle roll control according to the fourth embodiment, when the vehicle 10 turns, the imbalance in the roll stiffness distribution due to the difference between the roll stiffness of the front axle and the roll stiffness of the rear axle is suppressed from progressing, and the behavior of the vehicle 10 is suppressed from becoming unstable due to oversteer in the vicinity of the critical region.

4-2. Vehicle Roll Control Apparatus

Figure 10:
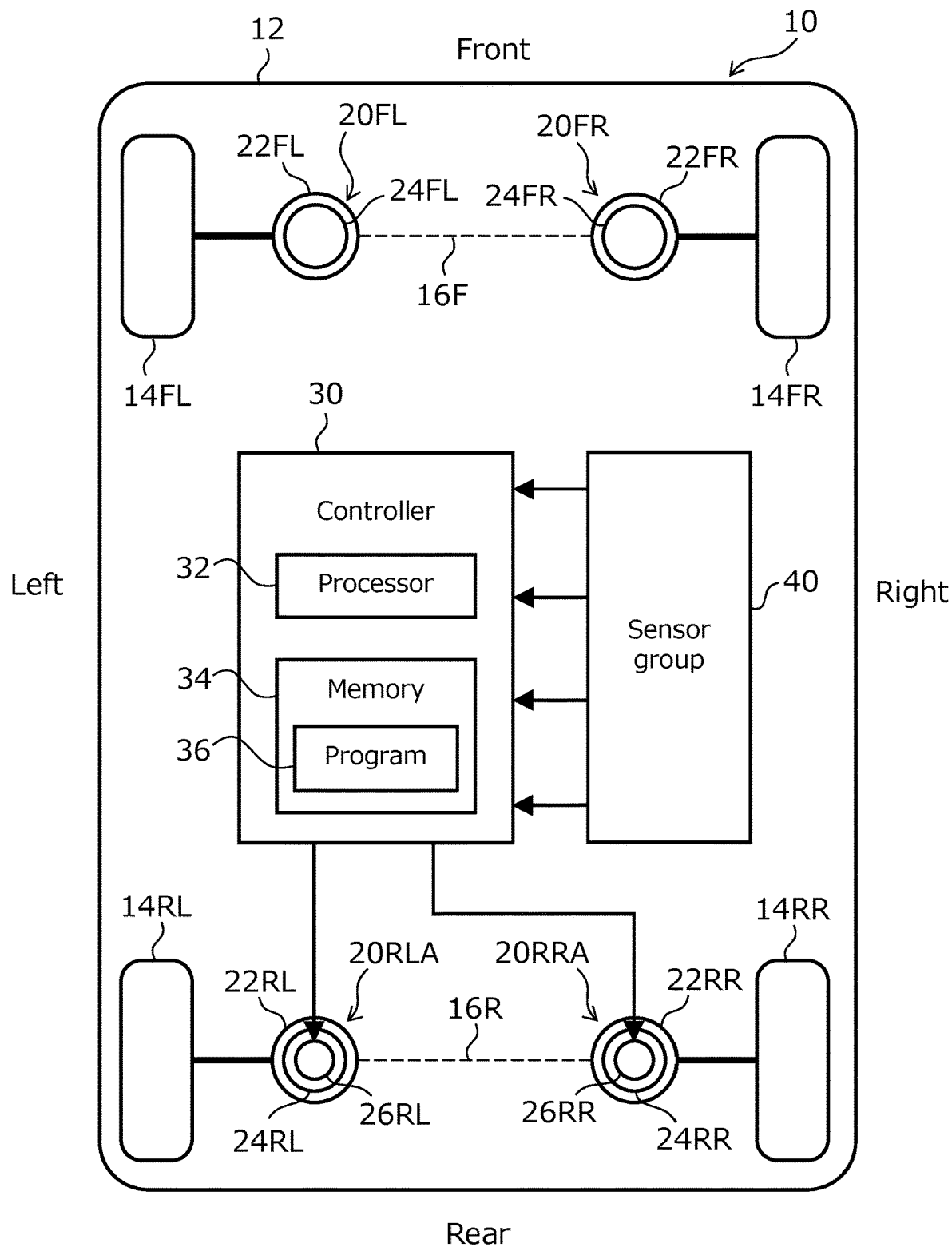
FIG. 10 is a diagram showing a configuration of a vehicle on which a vehicle roll control apparatus according to the fourth embodiment of the present disclosure is mounted.

Next, a vehicle roll control device for executing the above-described vehicle roll control will be described with reference to FIG. 10. FIG. 10 shows a configuration of the vehicle 10 on which the vehicle roll control apparatus according to the fourth embodiment is mounted. In FIG. 10, elements common to those of the first embodiment shown in FIG. 3 are denoted by common reference numerals. The description of elements of the vehicle 10 shown in FIG. 10 that have already been described in the first embodiment will be simplified or omitted.

As shown in FIG. 10, the left and right wheels 14FL and 14FR of the front axle 16F are suspended from the vehicle body 12 by the suspensions 20FL and 20FR. The left and right wheels 14RL and 14RR of the rear axle 16R are suspended from the vehicle body 12 by the active suspensions 20RLA and 20RRA.

The left and right suspensions 20FL and 20FR of the front axle 16F, which are non-active suspensions, include springs 22FL and 22FR and shock absorbers 24FL and 24FR. The left and right active suspensions 20RLA and 20RRA of the rear-axle 16R include the actuators 26RL and 26RR in addition to springs 22RL and 22RR and shock absorbers 24RL and 24RR. The actuators 26RL and 26RR are provided between the vehicle body 12 and the piston rods of the shock absorbers 24RL and 24RR. The actuators 26RL and 26RR are configured to hydraulically or electromagnetically generate vertical control forces between the vehicle body 12 and the left and right wheels 14RL and 14RR of the rear axle 16R.

The controller 30 is connected to the actuators 26RL and 26RR via an in-vehicle network. Control amounts for causing vertical control forces Frl and Frr to act between the vehicle body 12 and the left and right wheels 14RL and 14RR of the rear axle 16R are given from the controller 30 to the actuators 26RL and 26RR. In the fourth embodiment, the vehicle roll control program included in the program 36 is executed by the processor 32, whereby the vehicle roll control described in "4-1. Vehicle Roll Control" is achieved.

5. Fifth Embodiment 5-1. Vehicle Roll Control

Figure 11:
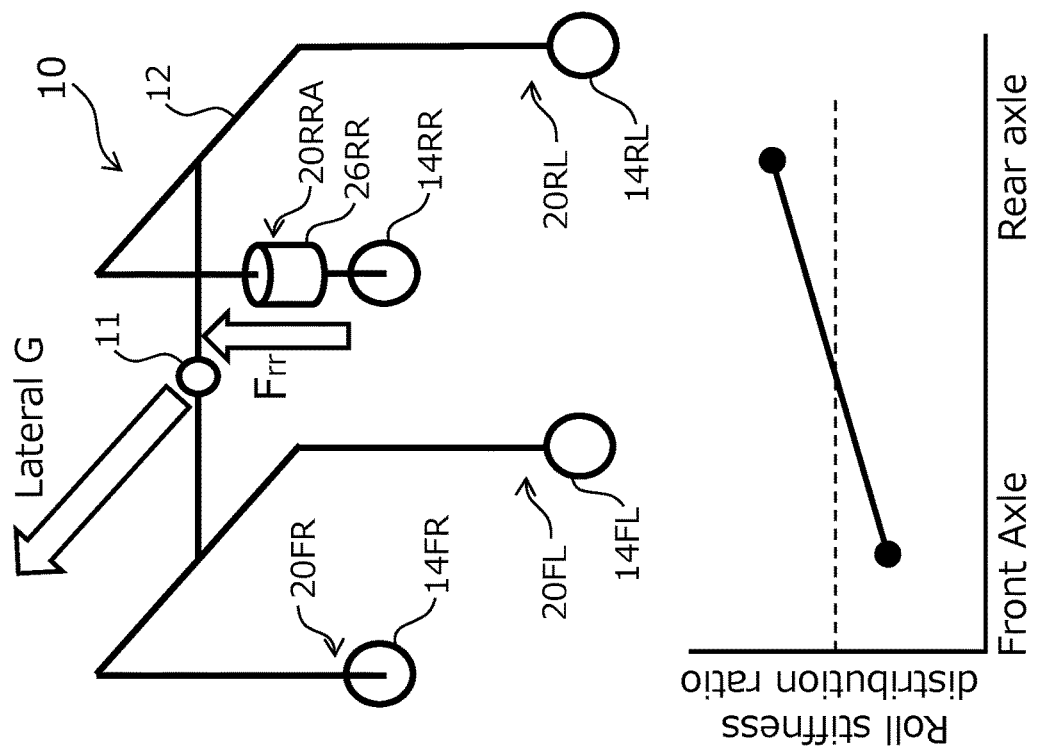
FIG. 11 is a conceptual diagram of vehicle roll control according to a fifth embodiment of the present disclosure.
Figure 11:
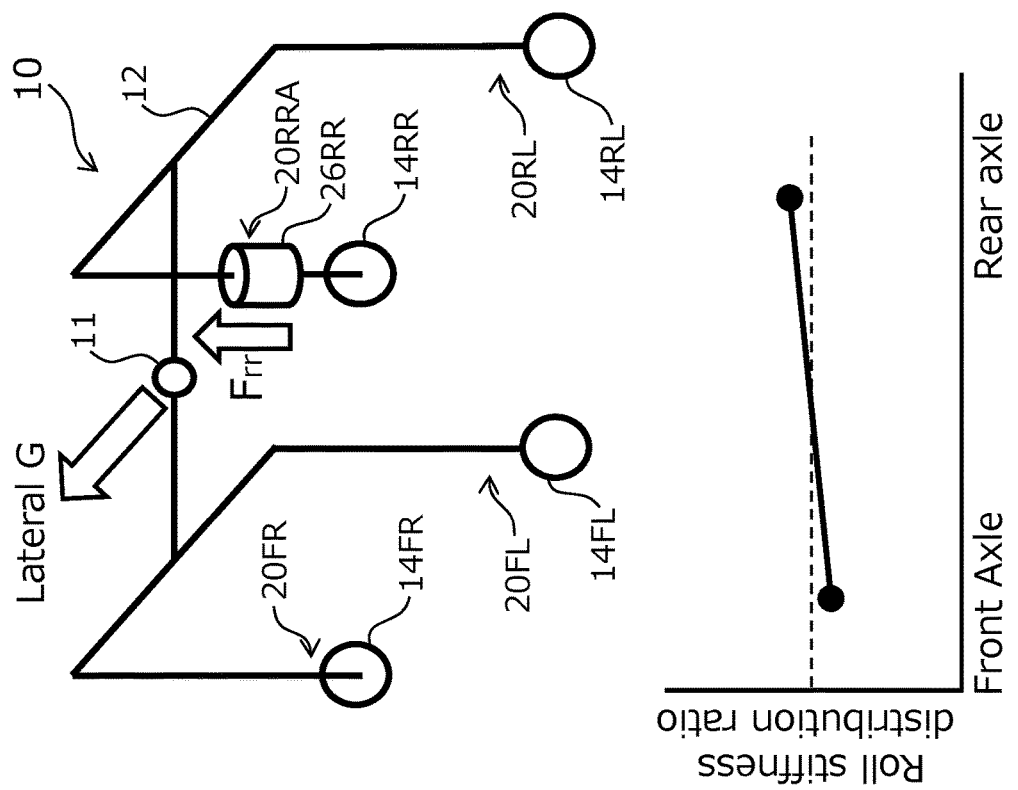

The vehicle roll control according to the fifth embodiment will be described with reference to FIG. 11. FIG. 11 is a conceptual diagram of the vehicle roll control according to the fifth embodiment. The conceptual diagram shown in FIG. 11 shows a modeled vehicle 10, a lateral acceleration acting on the gravity center 11 of the vehicle 10, and a control force for roll suppression applied by a roll stiffness varying device. A state in which the lateral acceleration is low is shown on the left side of FIG. 11, and a state in which the lateral acceleration is increased is shown on the right side. FIG. 11 also contains a graph showing a change in the roll stiffness distribution ratio between the front axle and the rear axle before and after the lateral acceleration increases.

The vehicle 10 shown in FIG. 11 includes an active suspension 20RRA suspending a right wheel 14RR of a rear axle (first axle). Specifically, the active suspension 20RRA of the fifth embodiment is a so-called full-active suspension that can actively apply a vertical control force between the vehicle body 12 and the wheel 14RR by an actuator 26RR. Suspensions 20FL and 20FR suspending left and right wheels 14FL and 14FR of a front axle (second axle) and a suspension 20RL suspending a left wheel 14RL of the rear axle are general suspensions without actuators, that is, non-active suspensions.

In the fifth embodiment, the single active suspension 20RRA of the rear axle functions as a first roll stiffness varying device that varies the roll stiffness of the rear axle. As shown in FIG. 11, when a rightward lateral acceleration acts on the vehicle 10, an upward control force Frr is applied to the right rear wheel 14RR by the actuator 26RR. By applying an upward force to the wheel 14RR on one side of the rear axle in this way, it is possible to increase the roll stiffness of the rear axle with respect to the lateral acceleration acting on the vehicle 10.

The control force Frr applied to the right wheel 14RR of the rear axle by the actuator 26RR is increased according to the lateral acceleration acting on the gravity center 11 of the vehicle 10. Typically, the control force Frr is increased in proportion to the lateral acceleration. In FIG. 11, the length of the arrow line indicating the direction of the lateral acceleration indicates the magnitude of the lateral acceleration, and the length of the arrow line indicating the direction of the control force Frr indicates the magnitude of the control force Frr.

In the fifth embodiment, when the vehicle 10 turns, the roll stiffness of the rear axle are increased by the single active suspension 20RRA of the rear axle, so that the roll of the vehicle 10 can be suppressed. However, if the roll stiffness of the rear axle is excessively increased, the roll stiffness distribution ratio is biased toward the rear axle. An imbalance in the roll stiffness distribution between the front axle and the rear axle leads to instability of the vehicle behavior in the vicinity of the critical region. Therefore, in the vehicle roll control according to the fifth embodiment, the increase in the control amount given to the actuator 26RR from a controller described later is suppressed so that the roll stiffness of the rear axle does not become excessively high when the imbalance in the roll stiffness distribution may occur.

As a method for suppressing the increase in the control amount, in the vehicle roll control according to the fifth embodiment, the control gain of the actuator 26RR is set with respect to the lateral acceleration as shown in FIG. 2 described above. Specifically, in the low acceleration range where the lateral acceleration is relatively low, the control gain of the actuator 26RR is held constant. When the lateral acceleration increases to the high acceleration range beyond the low acceleration range, the control gain of the actuator 26RR is gradually reduced in accordance with the increase in the lateral acceleration. An example of setting the threshold lateral acceleration for separating the low acceleration range and the high acceleration range is as described in the first embodiment.

As described above, the vehicle roll control according to the fifth embodiment is performed on the vehicle 10 provided with the single active suspension 20RRA on the rear axle. According to the vehicle roll control according to the fifth embodiment, when the vehicle 10 turns, the imbalance in the roll stiffness distribution due to the difference between the roll stiffness of the front axle and the roll stiffness of the rear axle is suppressed from progressing, and the behavior of the vehicle 10 is suppressed from becoming unstable due to oversteer in the vicinity of the critical region.

5-2. Vehicle Roll Control Apparatus

Figure 12:
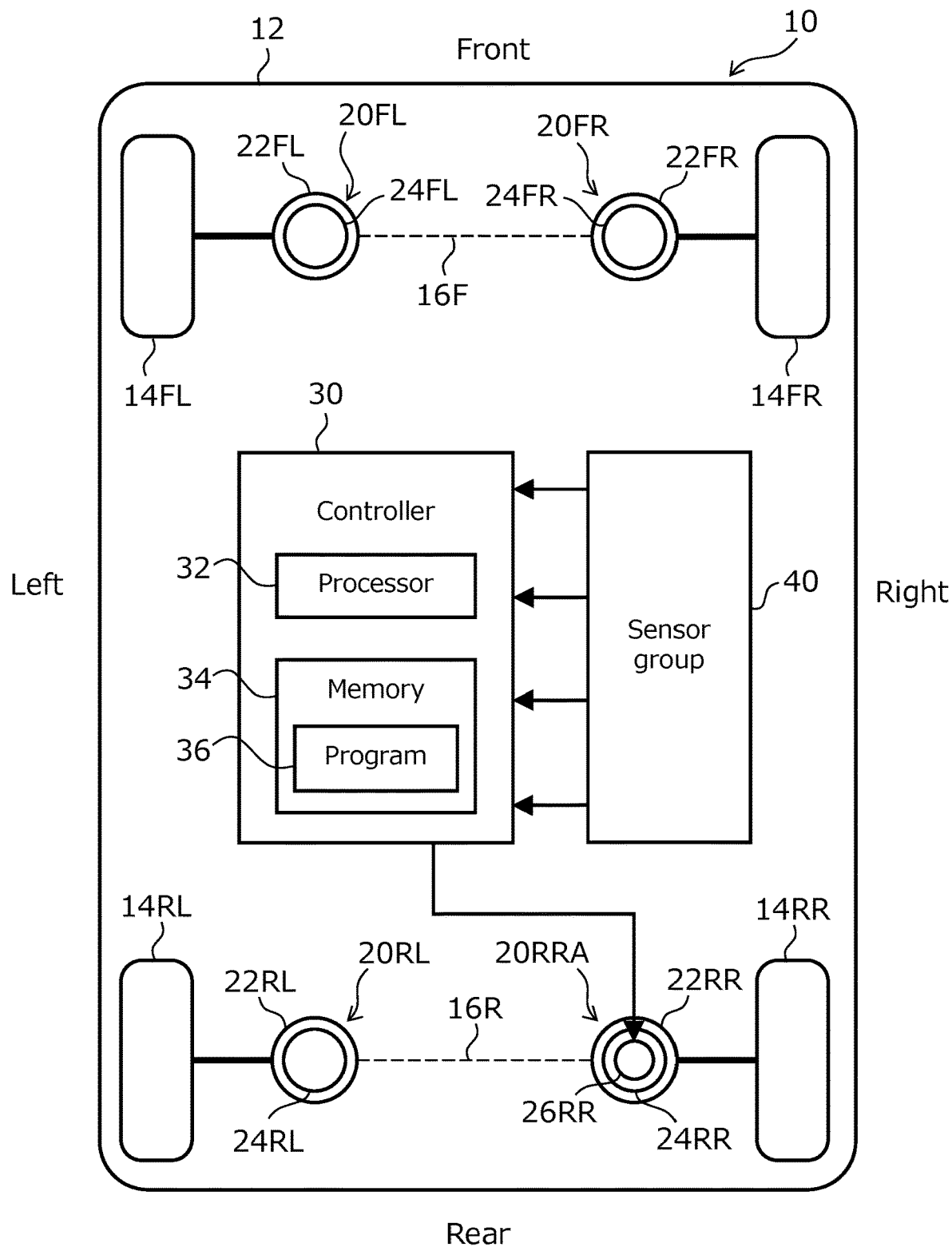
FIG. 12 is a diagram showing a configuration of a vehicle on which a vehicle roll control apparatus according to the fifth embodiment of the present disclosure.

Next, a vehicle roll control apparatus for executing the above-described vehicle roll control will be described with reference to FIG. 12. FIG. 12 shows a configuration of the vehicle 10 on which the vehicle roll control apparatus according to the fifth embodiment is mounted. In FIG. 12, elements common to those of the first embodiment shown in FIG. 3 are denoted by common reference numerals. The description of elements of the vehicle 10 shown in FIG. 12 that have already been described in the first embodiment will be simplified or omitted.

As shown in FIG. 12, the left and right wheels 14FL and 14FR of the front axle 16F and the left wheel 14RL of the rear axle 16R are suspended from the vehicle body 12 by the suspensions 20FL, 20FR and 20RL. Only the right wheel 14RR of the rear axle 16R is suspended from the vehicle body 12 by the active suspension 20RRA.

The left and right suspensions 20FL and 20FR of the front axle 16F and the left suspension 20RL of the rear axle 16R, which are non-active suspensions, include springs 22FL, 22FR and 22RL and shock absorbers 24FL, 24FR, and 24RL. The active suspension 20RRA on the right side of the rear axle 16R includes the actuator 26RR in addition to a spring 22RR and a shock absorber 24RR. The actuator 26RR is provided between the vehicle body 12 and the piston rod of the shock absorber 24RR. The actuator 26RR is configured to hydraulically or electromagnetically generate a vertical control force between the vehicle body 12 and the right wheel 14RR of the rear axle 16R.

The controller 30 is connected to the actuator 26RR via an in-vehicle network. A control amount for causing the vertical control force Frr to act between the vehicle body 12 and the right wheel 14RR of the rear axle 16R is given from the controller 30 to the actuator 26RR. In the fifth embodiment, the vehicle roll control program included in the program 36 is executed by the processor 32, whereby the vehicle roll control described in "5-1. Vehicle Roll control" is achieved.

6. Sixth Embodiment

Figure 13:
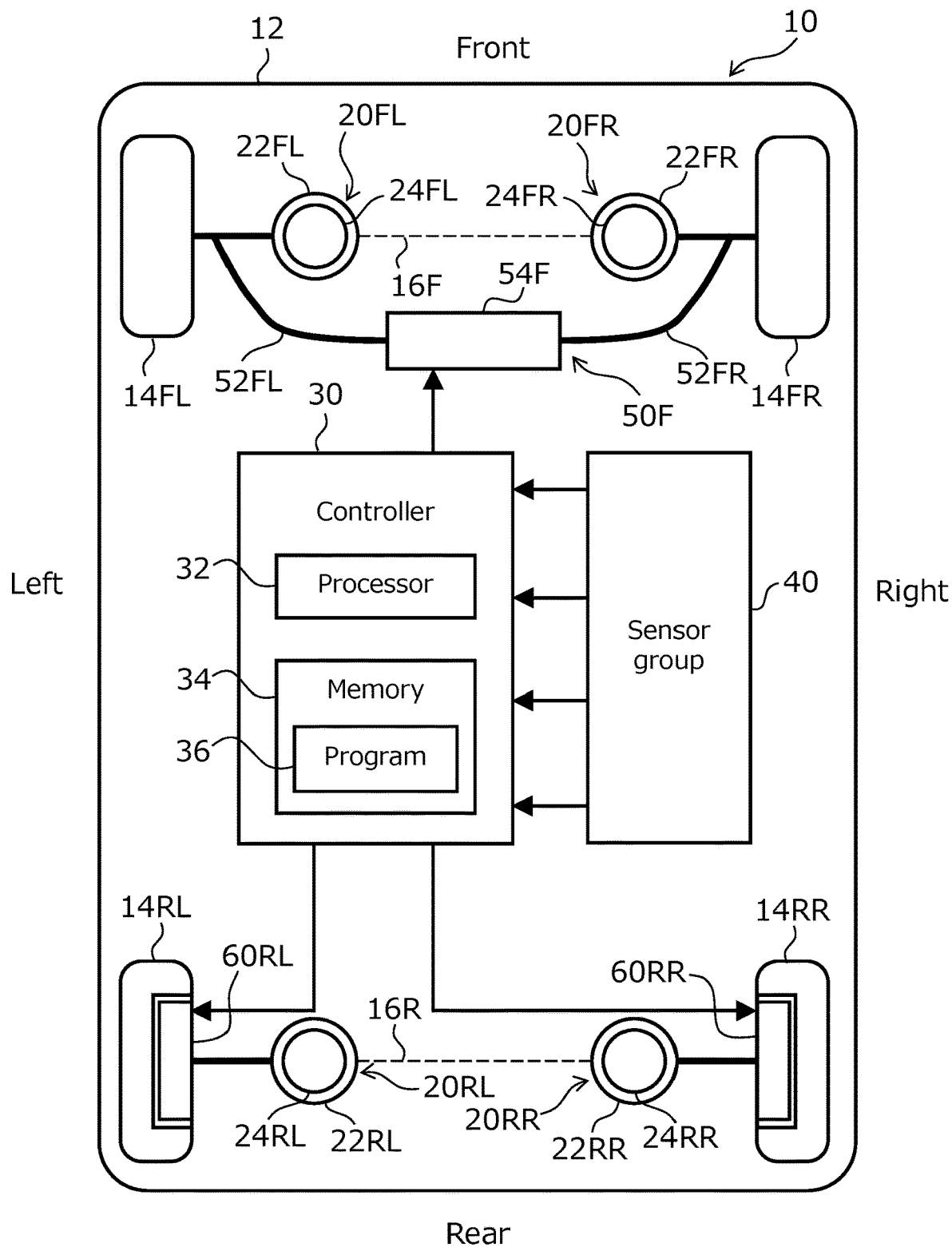
FIG. 13 is a diagram showing a configuration of a vehicle on which a vehicle roll control apparatus according to a sixth embodiment of the present disclosure.

FIG. 13 shows a configuration of a vehicle equipped with a vehicle roll control apparatus according to the sixth embodiment of the present disclosure. In FIG. 13, elements common to those of the first embodiment shown in FIG. 3 are denoted by common reference numerals. A description of elements of the vehicle 10 illustrated in FIG. 13 that have already been described in the first embodiment will be simplified or omitted.

As shown in FIG. 13, wheels 14FL, FR, 14RL, and 14RR of the vehicle 10 are suspended from the vehicle body 12 by suspensions 20FL, 20FR, 20RL, and 20RR. The suspensions 20FL, 20FR, 20RL, and 20RR are non-active suspensions without actuators. The suspensions 20FL, 20FR, 20RL, and 20RR include springs 22FL, 22RL, 22FR, 22RL, and 22RR and shock absorbers 24FL, 24FR, 24RL, and 24RR.

The vehicle 10 is equipped with an active stabilizer 50F on the front axle 16F. The active stabilizer 50F includes a left stabilizer bar 52FL, a right stabilizer bar 52FR, and an electric actuator 54F. The left stabilizer bar 52FL is connected to the suspension 20FL of the left front wheel 14FL. The right stabilizer bar 52FR is connected to the suspension 20FR of the right front wheel 14FR. The electric actuator 54F connects the left stabilizer bar 52FL and the right stabilizer bar 52FR so as to be rotatable relative to each other.

In the sixth embodiment, the active stabilizer 50F functions as a second roll stiffness varying device that varies the roll stiffness of the front axle 16F. For example, when a rightward lateral acceleration acts on the vehicle 10, the electric actuator 54F applies a torsion between the left and right stabilizer bars, whereby a downward control force Ffl is applied to the left front wheel 14FL and an upward control force Ffr is applied to the right front wheel 14FR. By applying vertical forces in opposite phases to the left and right wheels 14FL and 14FR of the front axle in this way, the roll stiffness of the front axle can be increased with respect to the lateral acceleration acting on the vehicle 10.

In the sixth embodiment, the vehicle 10 is equipped with in-wheel motors 60RL and 60RR on the left and right wheels 14RL and 14RR of the rear axle 16R. The in-wheel motors 60RL, 60RR may be of a direct drive type or a gear reduction type, for example. Due to the geometry of the suspension 20RL, a vertical control force Frl acting between the left rear wheel 14RL and the vehicle body 12 is generated from the braking force or driving force that the in-wheel motor 60RL applies to the left rear wheel 14RL. Due to the geometry of the suspension 20RR, a vertical control force Frr acting between the right rear wheel 14RR and the vehicle body 12 is generated from the braking force or driving force that the in-wheel motor 60RR applies to the right rear wheel 14RR.

In the sixth embodiment, the pair of left and right in-wheel motors 60RL and 60RR function as a first roll stiffness varying device that varies the roll stiffness of the rear axle 16R. For example, when a rightward lateral acceleration acts on the vehicle 10, a downward control force Frl is applied to the left rear wheel 14RL by the in-wheel motor 60RL, and an upward control force Frr is applied to the right rear wheel 14RR by the in-wheel motor 60RR. By applying vertical forces in opposite phases to the left and right wheels 14RL and 14RR of the rear axle in this way, it is possible to increase the roll stiffness of the rear axle 16R with respect to the lateral acceleration acting on the vehicle 10.

In the sixth embodiment, when the vehicle 10 turns, the roll stiffnesses of the front axle and the rear axle are increased by the in-wheel motors 60RL and 60RR and the active stabilizer 50F, so that the roll of the vehicle 10 can be suppressed. However, when the in-wheel motors 60RL and 60RR and the active stabilizer 50F are compared, the control force that can be output is smaller in the active stabilizer 50F. That is, the roll stiffness of the front axle achieved by the active stabilizer 50F is suppressed to be lower than the roll stiffness of the rear axle achieved by the in-wheel motors 60RL and 60RR. Therefore, there is a possibility that the roll stiffness distribution ratio is biased toward the rear axle 16R when the vehicle 10 turns.

An imbalance in the roll stiffness distribution between the front axle and the rear axle leads to instability of the vehicle behavior in the vicinity of the critical region. Therefore, in the vehicle roll control according to the sixth embodiment, the increase in the control amounts given to the in-wheel motors 60RL and 60RR from the controller 30 is suppressed so that the roll stiffness of the rear axle does not become excessively high when the imbalance in the roll stiffness distribution may occur.

As a method of suppressing the increase in the control amounts, the control gains of the in-wheel motors 60RL and 60RR are set with respect to the lateral acceleration as shown in FIG. 2 described above. Specifically, in the low acceleration range where the lateral acceleration is relatively low, the control gains of the in-wheel motors 60RL and 60RR are held constant. When the lateral acceleration increases to the high acceleration range beyond the low acceleration range, the control gains of the in-wheel motors 60RL and 60RR are gradually reduced in accordance with the increase in the lateral acceleration. An example of setting the threshold lateral acceleration for separating the low acceleration range and the high acceleration range is as described in the first embodiment.

The controller 30 is connected to the in-wheel motors 60RL and 60RR and the electric actuator 54F via an in-vehicle network. Control amounts for causing the vertical control forces Frl and Frr to act between the vehicle body 12 and the left and right wheels 14RL and 14RR of the rear axle 16R are given from the controller 30 to the in-wheel motors 60RL and 60RR. Further, a control amount for causing the vertical control forces Ffl and Ffr to act between the vehicle body 12 and the left and right wheels 14FL and 14FR of the front axle 16F is given from the controller 30 to the electric actuator 54F. In the sixth embodiment, the vehicle roll control program included in the program 36 is executed by the processor 32, whereby the above-described vehicle roll control is achieved.

7. Other Embodiments

In the first embodiment, the left and right suspensions of the front axle 16F may be active suspensions, the left and right suspensions of the rear axle 16R may be non-active suspensions, and an active stabilizer may be provided on the rear axle 16R. In this case, the control gains of the right and left active suspensions of the front axle 16F are set in accordance with the lateral acceleration as shown in FIG. 2. As a result, the roll stiffness distribution ratio is prevented from being biased toward the front axle 16F during turning of the vehicle 10, and excessive understeer is prevented from occurring in the vicinity of the critical region.

In the second embodiment, the suspension on the left side of the front axle 16F may be an active suspension instead of the suspension on the right side of the front axle 16F. Further, the left and right suspensions of the front-axle 16F may be active suspensions, and the suspension of one side of the rear axle 16R may be an active suspension. However, when the left and right suspensions of the front axle 16F are active suspensions, the control gains of the left and right active suspensions of the front axle 16F are set in accordance with the lateral acceleration as shown in FIG. 2.

In the third embodiment, an active stabilizer may be provided on the front axle 16F instead of providing the active stabilizer on the rear axle 16R. In this case, the control gain of the active stabilizer of the front axle 16F are set in accordance with the lateral acceleration as shown in FIG. 2.

In the fourth embodiment, the left and right suspensions of the front axle 16F may be active suspensions, and the left and right suspensions of the rear axle 16R may be non-active suspensions. In this case, the control gains of the right and left active suspensions of the front axle 16F are set in accordance with the lateral acceleration as shown in FIG. 2.

In the fifth embodiment, the wheel on which the active suspension is provided may be the left rear wheel, the right front wheel, or the left front wheel. However, when the active suspension is provided on the front wheel, the control gain of the active suspension is set in accordance with the lateral acceleration as shown in FIG. 2.

In the first, second, and fourth embodiments, the suspensions 20RLA and 20RRA of the rear axle 16R may be non-active suspensions, and instead, in-wheel motors 60RL and 60RR as in the sixth embodiment may be provided.

In the first, second, fourth, and fifth embodiments, the active suspension mounted on the vehicle 10 may be a so-called semi-active suspension that generates a vertical control force by making a coefficient of a spring or damping force variable. In the case of the second embodiment, the suspension 20FRA of the front axle 16F may be a full-active suspension, and the suspensions 20RLA and 20RRA of the rear axle 16R may be semi-active suspensions. Conversely, the suspension 20FRA of the front axle 16F may be a semi-active suspension, and the suspensions 20RLA and 20RRA of the rear axle 16R may be full-active suspensions.

What is claimed is:

1. A vehicle roll control apparatus, comprising:
an active suspension having an actuator provided for a first axle of a vehicle and configured to vary roll stiffness of the first axle;
an active stabilizer having an actuator provided for a second axle of the vehicle and configured to vary roll stiffness of the second axle, the active stabilizer has a control amount that is lower than a control amount of the active suspension; and
a processor configured to control the active suspension and the active stabilizer,
the processor is configured to:
increase a control amount of the active suspension so as to increase the roll stiffness of the first axle while increasing a control amount of the active stabilizer so as to increase the roll stiffness of the second axle in accordance with an increase in a lateral acceleration acting on the vehicle, and
decrease a gain of the control amount of the active suspension with respect to the lateral acceleration in accordance with the increase in the lateral acceleration when the lateral acceleration increases to a high acceleration range beyond a low acceleration range so that a roll stiffness distribution ratio of the first axle does not exceed a predetermined value when the lateral acceleration increases to the high acceleration range beyond the low acceleration range.

2. The vehicle roll control apparatus according to claim 1, wherein the actuator of the active suspension is a pair of left and right actuators provided for left and right wheels of the first axle and configured to apply vertical forces in opposite phases to the left and right wheels of the first axle.

3. The vehicle roll control apparatus according to claim 1, wherein the actuator of the active suspension is a pair of left and right actuators provided for left and right wheels of the first axle and configured to apply vertical forces in opposite phases to the left and right wheels of the first axle, and
the active stabilizer connects a pair of left and right suspensions provided for left and right wheels of the second axle.

4. The vehicle roll control apparatus according to claim 1, wherein the processor is configured to estimate that the lateral acceleration has increased to the high acceleration range beyond the low acceleration range, based on the lateral acceleration reaching a predetermined value.

5. The vehicle roll control apparatus according to claim 1, wherein the processor is configured to estimate that the lateral acceleration has increased to the high acceleration range beyond the low acceleration range, based on any suspension hitting a bound stopper or shrinking to a vicinity of the bound stopper.

6. The vehicle roll control apparatus according to claim 1, wherein the processor is configured to estimate that the lateral acceleration has increased to the high acceleration range beyond the low acceleration range, based on roll stiffness distribution ratio of the first axle reaching a predetermined value.

7. The vehicle roll control apparatus according to claim 1, wherein the processor is configured to estimate that the lateral acceleration has increased to the high acceleration range beyond the low acceleration range, based on a load transfer amount from a second axle to the first axle reaching a predetermined value.

* * * * *